United States Patent
VanderSpek

(10) Patent No.: US 6,477,591 B1
(45) Date of Patent: Nov. 5, 2002

(54) METHOD AND APPARATUS FOR STORING AND COPYING DATA VIA A FIRST PATH AND A SECOND PATH WHEREIN SECOND PATH BYPASSES MIRROR DRIVER

(75) Inventor: Adrian VanderSpek, Worcester, MA (US)

(73) Assignee: Highground Systems, Inc., Marlboro, MA (US)

( * ) Notice: Subject to any disclaimer, the term of this patent is extended or adjusted under 35 U.S.C. 154(b) by 0 days.

(21) Appl. No.: 09/033,806

(22) Filed: Mar. 3, 1998

(51) Int. Cl.[7] ............................ G06F 13/00; G06F 11/00
(52) U.S. Cl. ............................ 710/38; 710/130; 710/20; 711/162; 714/1; 714/2; 714/6
(58) Field of Search ............................ 710/20, 38, 68, 710/130; 711/111, 112, 114, 162; 714/1, 2, 6

(56) References Cited

U.S. PATENT DOCUMENTS

| | | | |
|---|---|---|---|
| 4,993,030 A | * 2/1991 | Krakauer et al. | 714/6 |
| 5,212,784 A | * 5/1993 | Sparks | 714/6 |
| 5,379,374 A | * 1/1995 | Ishizaki et al. | 345/331 |
| 5,513,314 A | * 4/1996 | Kandasamy et al. | 714/6 |
| 5,633,999 A | * 5/1997 | Clowes et al. | 714/6 |
| 5,638,538 A | * 6/1997 | VanDoren et al. | 710/1 |
| 5,740,397 A | * 4/1998 | Levy | 711/114 |
| 5,802,364 A | * 9/1998 | Senator et al. | 709/301 |
| 5,815,649 A | * 9/1998 | Utter et al. | 714/6 |
| 5,828,820 A | * 10/1998 | Onishi et al. | 714/6 |
| 5,875,478 A | * 2/1999 | Blumenau | 711/162 |
| 5,893,919 A | * 4/1999 | Sarkozy et al. | 711/114 |
| 5,960,216 A | * 9/1999 | Vishlitzky et al. | 710/74 |
| 5,987,566 A | * 11/1999 | Vishlitzky et al. | 711/114 |
| 6,026,454 A | * 2/2000 | Hauck et al. | 710/65 |

OTHER PUBLICATIONS

Alta Vista—Web Results, www.altavista.com, Mirror—Misc. Reference Manual pages by Lee Mcloughlin, Dec. 2, 1993*

* cited by examiner

*Primary Examiner*—Thomas C. Lee
*Assistant Examiner*—Tammara Peyton
(74) *Attorney, Agent, or Firm*—Mintz, Levin, Cohn, Ferris, Glovsky and Popeo, P.C.

(57) ABSTRACT

A method and apparatus for providing mirroring of off-line storage data in a computer system. In one embodiment of the present invention, a computer system includes an application program, a plurality of storage devices, at least one storage driver that provides an interface between the application program and the plurality of storage devices, and a mirror driver that receives an I/O request from the application program requesting access to one of the plurality of storage devices, duplicates the I/O request to create a plurality of I/O requests, and sends the plurality of I/O requests to the storage driver so that each of the plurality of storage devices receives and processes one I/O request. In embodiments of the present invention, the computer system further includes a mirror application that communicates with the mirror driver to establish mirror sets of the plurality of storage devices.

16 Claims, 26 Drawing Sheets

METHOD AND APPARATUS FOR STORING AND COPYING DATA VIA A FIRST PATH AND A SECOND PATH WHEREIN SECOND PATH BYPASSES MIRROR DRIVER

FIELD OF THE INVENTION

The present invention relates generally to an apparatus and process for controlling media storage devices, and more particularly to a method and process for configuring and controlling media storage devices to provide fault tolerant mirroring of data and to provide copying of data from one storage medium to another.

BACKGROUND OF THE INVENTION

Prior art systems for providing fault tolerant mirroring and high-availability for on-line data in computer systems are well-known. Redundant arrays of independent disks (RAID) are used in many prior art applications to provide mirroring of on-line data on disk drives to provide redundant copies of data to increase the fault tolerance of computer systems.

Systems for providing fault tolerance for off-line data are less known. In a typical prior art computer system, a backup utility program is used to provide periodic off-line storage of data contained in on-line storage devices of the computer system. Typically, the backup utility program performs a backup operation to copy data contained on disks in one or more disk drives of a computer system onto a tape contained in a tape drive. Depending on the quantity of data to be copied, the backup operation may be fairly time consuming, and therefore, backup operations are typically performed during off hours, either automatically or under the control of an operator.

Typical backup utility programs also provide the capability to copy data from a tape drive to one or more disk drives. Such an operation is referred to as a restore operation and is used to restore data to the disks contained in the disk drives after the occurrence of a failure in the computer system that has caused a loss of data.

There are several drawbacks associated with typical prior art backup operations. First, if a tape or a tape drive fails during a backup operation, then the entire backup operation must be repeated. This is particularly a problem for back up operations of large quantities of data and for backup operations that are intended to run automatically during off hours. In the case of automatic backups, if there is no operator present to replace a failed tape or tape drive, then the opportunity to perform a backup operation may be missed.

Second, in typical prior art systems, when a failure or glitch occurs during a restore operation, the entire restore operation must be repeated. If the failure or glitch occurred due to a problem with a tape, it may not be possible to repeat the restore operation.

Third, there is often the desire to create multiple copies of backup data, so that for critical data, one or more copies may be stored off-site in addition to one copy that is stored on-site. Typical prior art systems do not provide the capability to easily produce multiple copies of backup data.

There are prior art devices that provide mirroring of off-line backup data. One prior art system provides the capability for mirroring within a backup application. The backup application opens two or more tape storage devices, and then accesses the tape storage devices in parallel to provide redundant storage of backup data. One disadvantage of this system is that it only offers redundant storage to users of the backup application. In some systems, multiple applications are used to access backup tape storage devices. If only one of these applications provides mirroring of data, then a common backup policy cannot be utilized across all of the applications.

In another prior art computer system, mirroring of backup data is implemented using specialized hardware. The specialized hardware includes a multiple tape drive system that presents itself to applications of the computer system as a single tape drive accessible over a standard Input/Output (I/O) bus such as a Small Computer System Interface (SCSI) bus. A backup application accesses the multiple tape drive system in the same manner as it accesses a single tape drive so that the mirroring of data is transparent to the backup application. One disadvantage of this system is that it is hardware specific. Only the specialized hardware can be used, preventing users from using their existing hardware or other hardware of their choice.

It is desirable that the above-described drawbacks of prior art backup operations be overcome in a manner that is essentially transparent to the backup utility program. It is also desirable to provide a solution to the above-described drawbacks for computer workstations and servers that utilize the Microsoft® Windows NT operating system.

SUMMARY OF THE INVENTION

Embodiments of the present invention overcome the drawbacks of prior art systems described above and provide a method and apparatus for mirroring off-line data in one or more storage devices utilizing a layered driver between a standard backup application and the storage devices.

In a first embodiment of the present invention, a computer system includes an application program, a plurality of storage devices, some of which form a mirror set, at least one storage driver that provides an interface between the application program and the plurality of storage devices, and a mirror driver that receives an I/O request from the application program requesting access to one of the plurality of storage devices, duplicates the I/O request to create a plurality of I/O requests, and sends the plurality of I/O requests to the storage driver so that each of a plurality of the storage devices receives and processes one I/O request.

In one version of the first embodiment, the computer system further comprises a mirror application that communicates with the mirror driver to establish which of the plurality of storage devices are to be part of the mirror set.

In another version of the first embodiment, the application is a backup application, the I/O request from the application program includes backup data that is to be stored in one of the plurality of storage devices, and the mirror driver sends a copy of the backup data to each of the plurality of devices in the mirror set so that a copy of the backup data is stored in each of the plurality of devices of the mirror set.

In another version of the first embodiment, the computer system includes a first buffer and a second buffer and the mirror driver in response to a read request is configured to read data from a first storage device of the mirror set and store it in the first buffer, and to read data from each of the remaining storage devices of the mirror set and store it in the second buffer.

In another version of the first embodiment, the mirror application is configured to, upon request by a user, send a request to the mirror driver requesting that data on a storage medium in a first storage device be copied to a storage medium on a second storage device.

In yet another version of the first embodiment, each of the plurality of storage devices is a tape drive.

A second embodiment of the present invention is directed to a data storage method for storing data in and retrieving data from a plurality of storage devices. The method includes steps of receiving a storage command for one of the plurality of storage devices, duplicating the storage command to create a plurality of storage commands, and sending one of the storage commands to each of the plurality of storage devices.

In one version of the second embodiment, the step of receiving includes a step of receiving backup data that is to be stored on the one of the plurality of storage devices, the step of duplicating includes a step of duplicating the backup storage data to create a plurality of copies of the backup data, and the step of sending includes a step of sending one copy of the backup data to each of the plurality of storage devices.

In another version of the second embodiment, the method further includes steps of reading data from a first device of the plurality of storage devices, storing data read from the first device of the plurality of storage devices in a first buffer, reading data from each of the plurality of devices other than the first device, and storing data read from each of the plurality of devices other than the first device in a second buffer.

In another version of the second embodiment, the method further includes steps of verifying that data was successfully read from the first device, and deleting the data stored in the second buffer.

In yet another version of the second embodiment, the method further includes steps of detecting that data was not successfully read from the first device, reading data from one of the plurality of devices other than the first device, and storing the data read from the one of the plurality of devices other than the first device in the first buffer.

In still another version of the second embodiment, the method further includes a step of copying data from a storage medium in a first of the plurality of storage devices to a storage medium in a second of the plurality of storage devices.

A third embodiment of the present invention is directed to a computer readable medium for containing a computer program for a computer system having a processor, an operating system, an application program, a plurality of storage devices, and at least one storage driver that acts as an interface between the application program and the plurality of storage devices, the computer program including instructions for implementing the method of the second embodiment described above in the computer system.

BRIEF DESCRIPTION OF THE DRAWINGS

For a better understanding of the present invention, reference is made to the drawings which are incorporated herein by reference and in which.

DETAILED DESCRIPTION

For purposes of illustration, embodiments of the present invention will now be described with reference to a computer system using the Microsoft® Windows NT operating system. One skilled in the art will appreciate, however, that embodiments of the present invention are not limited to computer systems having the Microsoft® Windows NT operating system, but may also be utilized with other operating systems such as UNIX based operating systems. Further, embodiments of the present invention are not limited to storage applications that utilize tape drives, but may be used with other storage devices as well.

Figure 1:
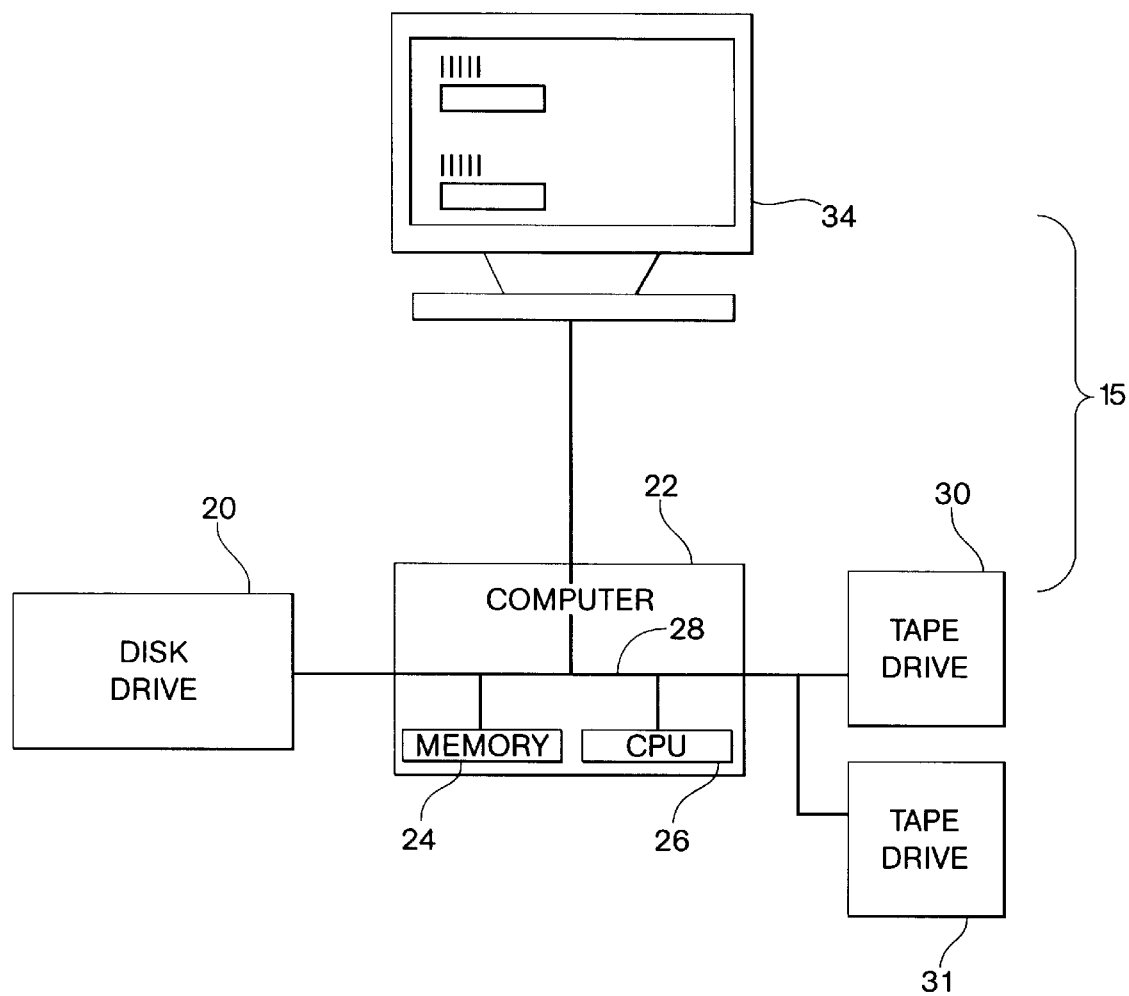
FIG. 1 is a block diagram of a typical computer system.

A first embodiment of the present invention will now be described with reference to FIG. 1 which shows a typical computer system 15 operating using the Microsoft® Windows NT operating system. The computer system 15 includes a computer chassis 22 that contains a volatile random access memory 24 connected to a central processing unit (CPU) 26 through a 16 bit SCSI bus 28 using a SCSI controller. The computer system 15 also includes a display device 34, a disk drive unit 20, and two tape drives 30 and 31 all connected to the CPU through the bus 28. The disk drive unit and the tape drive units may be installed within the computer chassis 22. In addition, the computer system may also include one or more CD ROM drives. As understood by those skilled in the art, the operating system resides in one or more of the memory 24, the disk drive 20, and the CPU 26, depending on, among other things, the present operational state of the computer system. Typical prior art backup utility applications operate within a computer system such as computer system 15 to copy data from the disk drive 20 over the bus 28 to one of the tape drives 30 or 31. Examples of prior art backup utility applications that operate in a Windows NT environment include Seagate Backup Exec™ for Windows NT®, Version 6.11, Seagate Backup Exec™ for Windows NT®, Version 7.0, and Windows NT backup which is a utility provided within the Microsoft® Windows NT operating system.

Figure 2:
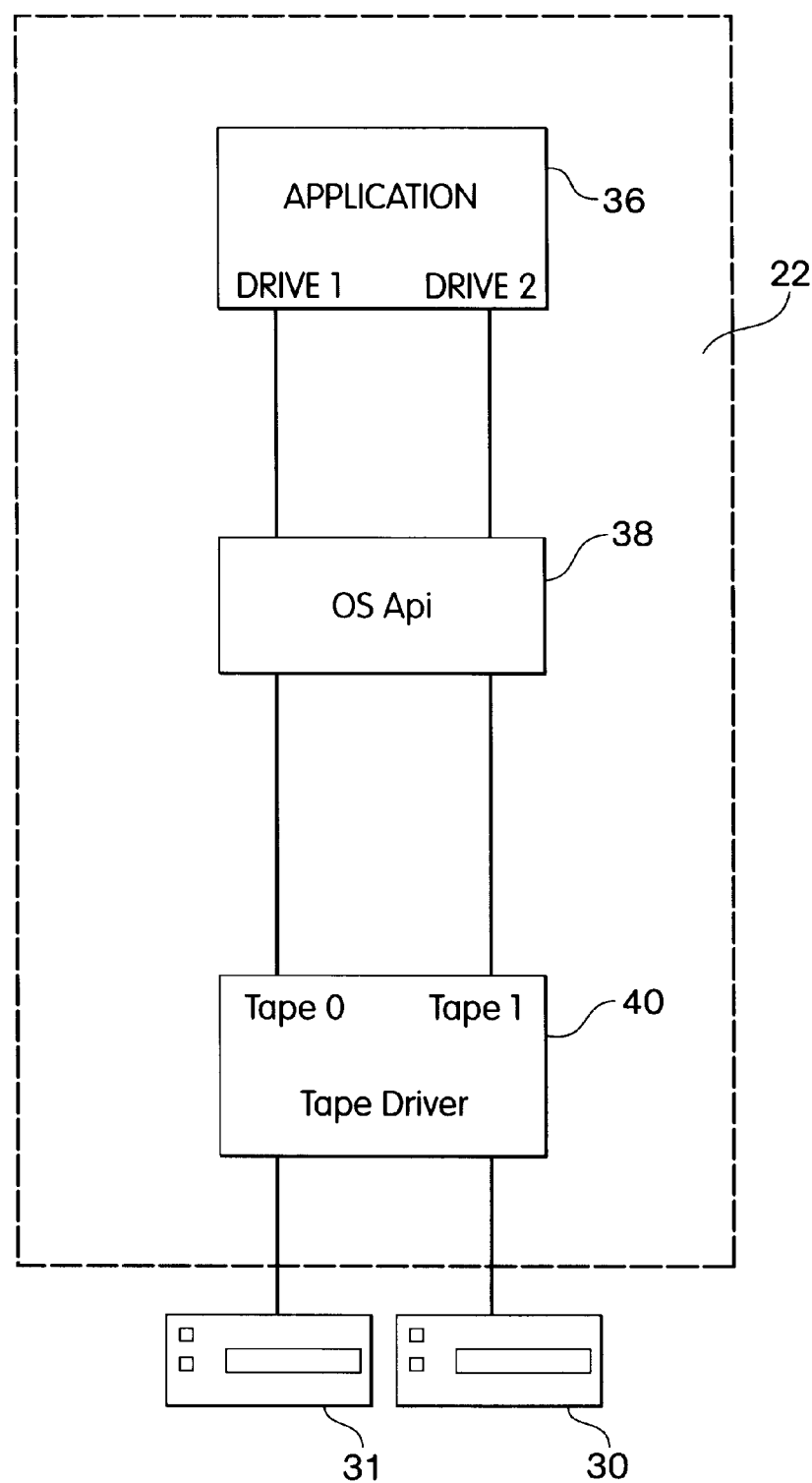
FIG. 2 is a functional block diagram showing the logical connections between an application and a tape driver in accordance with the prior art.

Typical operation of the computer system 15 to access the tape storage devices 30 and 32 will now be further described with reference to FIG. 2, which shows a backup application 36 that accesses the tape drives 30 and 31 through an operating system (OS) application program interface (API) 38 and a tape driver 40. The application 36, the application program interface and the tape driver all reside within the computer chassis 22. The tape driver controls and monitors each of the tape drives 30 and 31 by creating a named device object for each of the tape drives connected thereto and by advertising the names of the device objects to the operating system. In FIG. 2, the tape drives are identified as tape device 0 and tape device 1, and a separate connection is shown between each of the tape drives and the computer 22. The two connections shown represent logical connections created when the tape drives are accessed by the application 36. As discussed above, each of tape drives 30 and 31 is physically connected to the computer 22 through a common SCSI bus 28.

The application 36 accesses one of the tape devices by first calling the operating system API 38 to open a connection to the tape device and receive a handle from the operating system. The application 36 then accomplishes a desired I/O function with the tape device by making tape access API calls using the handle it received from the operating system. When the desired I/O function is complete, the application 36 makes a call to the API to close the connection to the tape device.

The operating system receives the API calls, creates I/O requests and sends the I/O requests to the tape driver 40. An I/O request tells the tape driver what operation is desired, and to which device. The tape driver performs the necessary I/O commands to the tape storage device to satisfy the request, and sends results back to the operating system. The operating system then provides indication of the completion of the API call to the application 36. For some calls (identified as synchronous calls), execution of the application is suspended until indication of the completion of the API call is received from the operating system. For other calls (identified as asynchronous calls), execution of the call continues in parallel with the execution of the API call, and some predefined notification mechanism is used by the operating system to let the application know when the API call has completed.

Figure 3:
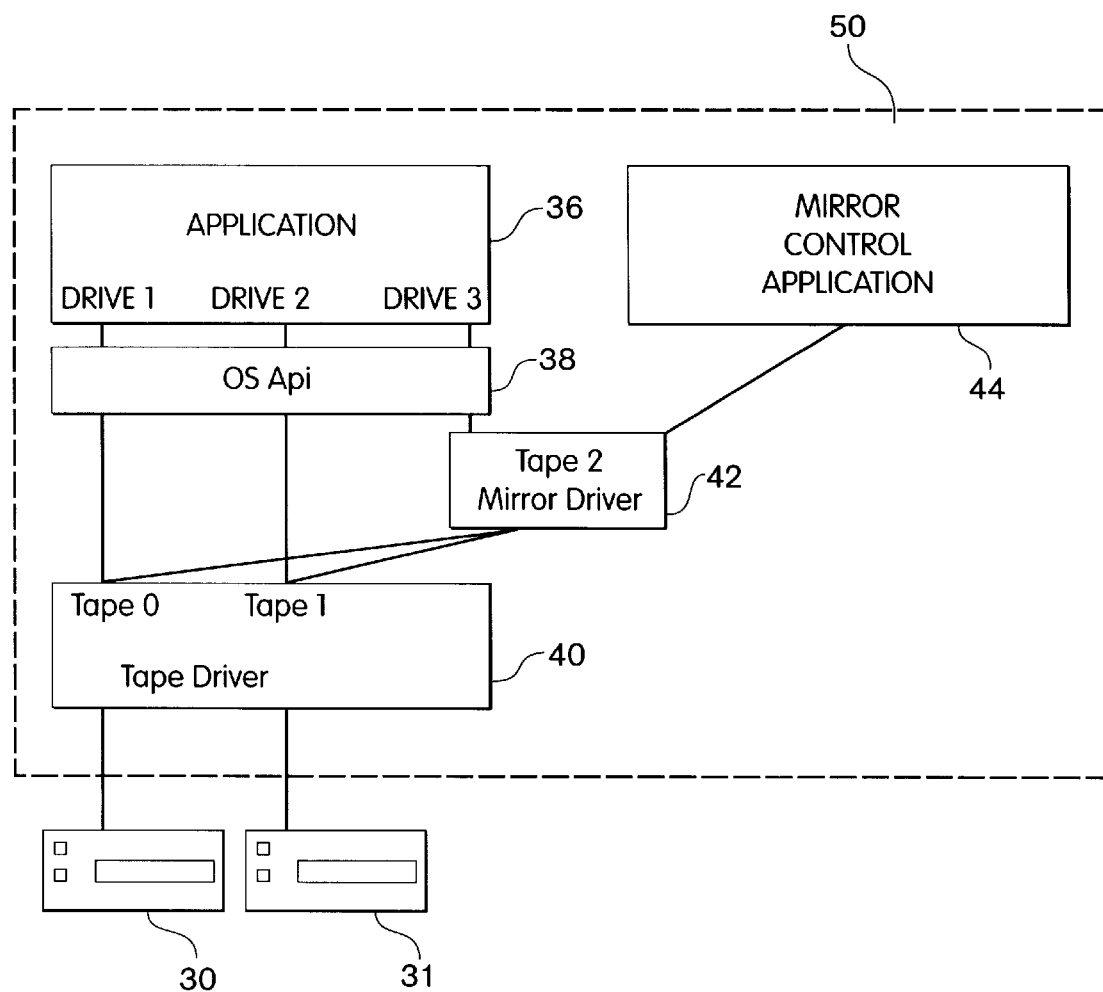
FIG. 3 is a functional block diagram showing the logical connections between a tape driver, a mirror diver and a mirror application in accordance with one embodiment of the present invention.

FIG. 3 shows the system of FIG. 2 with the addition of data mirroring capability in accordance with one embodiment of the present invention. In FIG. 3, a computer system 50 is coupled to two tape drives 30 and 31 in a similar manner to that described above with reference to FIG. 2. Computer system 50 is similar to computer system 15 described above, however, in addition to the application 36, operating system API 38, and tape driver 40 included in computer system 15, computer system 50 also includes a tape mirror driver 42 and a mirror control application 44. The mirror driver 42 is layered above the tape driver 40, and the mirror control application 44 is in communication with and controls the mirror driver 42. In one embodiment, the computer system 50 includes a 90 MHz Pentium® processor, a super VGA monitor, and a CD ROM drive.

In the embodiment shown in FIG. 3, the mirror driver 42, similar to the tape driver 40, creates a named device object and advertises the name of the device object to the operating system. The mirror driver recognizes the existence of the device objects named tape 0 and tape 1, created by the tape driver 40, and creates a third device object named tape 2. The backup application, through the operating system API, recognizes the availability of three tape drives identified as tape 0, tape 1, and tape 2.

In computer system 50, the application 36 accesses the tape drives 30 and 31 in the same manner as in computer 22 described above through tape driver 40. In addition, in computer 50, application 36 can access both tape drives 30 and 31 in a mirrored configuration through the mirror driver 42, as described in greater detail below. If the application selects the third device (tape 2), a device object of the mirror driver will be opened, and all I/O requests will be sent by the operating system to the mirror driver in the same manner that I/O requests are sent to the tape driver 40. The mirror driver opens tape drives in accordance with a mirror configuration previously established by a user of the computer system through the mirror control application. A number of different mirror configurations may be supported by the mirror driver. Each of the mirror configurations is identified as a mirror set.

When the mirror driver receives I/O requests from the operating system, it does the necessary I/O operations with the tape storage devices to accomplish fault tolerant mirroring by creating I/O requests and sending them to the tape device driver 42. When the tape device driver completes the requests, the results are reviewed by the mirror driver, and if appropriate, the I/O request to the mirror driver is completed and sent back to the operating system.

The mirror control application 44 is used to configure the mirror driver and to display status of the mirror driver. The mirror driver performs mirroring transparent to the backup application 36. The backup application accessing the mirror driver does not treat the mirror driver any differently than it treats the tape driver, and the backup application, in one embodiment of the present invention, is not aware that mirroring is occurring. Thus, status about a mirroring operation is not passed back to the backup application, but rather, the mirror control application monitors and displays status of mirroring operations.

As is known to those skilled in the art, in the Windows NT operating system, device drivers, such as the tape driver 40, create device objects for each device controlled by the driver. The creation of device objects occurs either upon initial boot up of the operating system or when a device driver is installed. The creation of the device objects allows the operating system to recognize devices and make them available for use to applications. In a similar manner to other drivers, the mirror driver establishes a device object for each mirror set established by the mirror application.

The mirror driver also creates a special device object that is used for controlling the mirror driver. The special device object is sent I/O commands by the mirror application to define how many mirror sets are to be controlled by the mirror driver and to provide a list of the tape drives contained in each mirror set. The mirror application also provides I/O commands to the mirror driver through the special device object to obtain status information about the mirror sets. For example, if an error is detected in one of the tape drives of a mirror set, the mirror driver will mark that tape drive as failed and stop accessing that tape drive. Upon receipt of a status command from the mirror application, the mirror driver will flag that an error has been detected with one of the tape drives, and provide information about that error to the mirror application. The mirror application will then display information concerning the error. In one embodiment of the present invention a visual alarm on the screen and/or an audible alarm may be activated by the mirror application upon receipt of an error.

Figure 4:
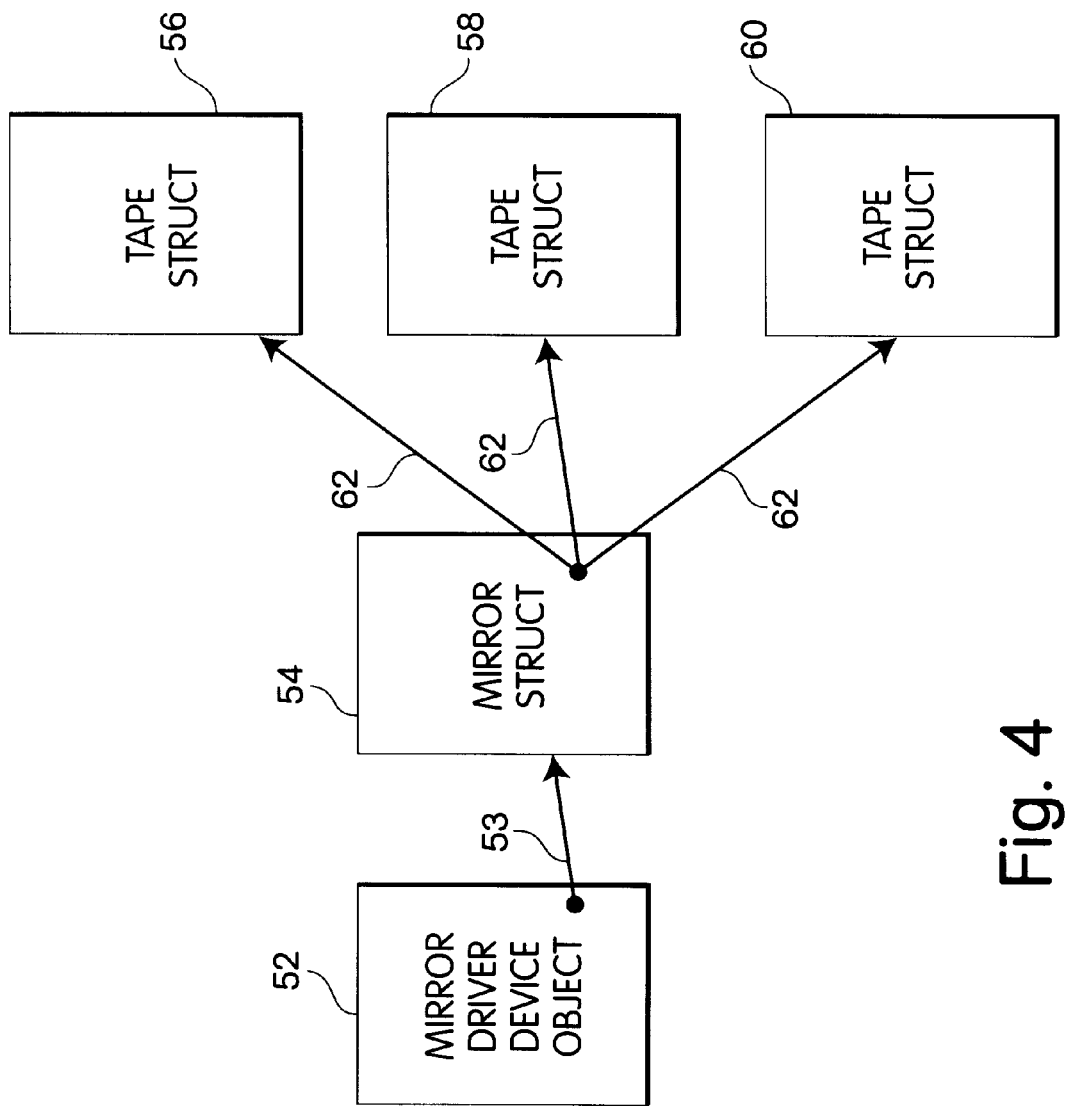
FIG. 4 is functional block diagram demonstrating the use of worker threads in accordance with one embodiment of the present invention.

A data control model for the mirror driver 42 in accordance with one embodiment of the present invention will now be described with reference to FIG. 4, which shows a mirror driver device object 52 of the mirror driver coupled to a mirror structure 54. The mirror structure is coupled to three tape structures 56, 58 and 60, each of which corresponds to a tape drive of a mirror set corresponding to the mirror driver device object 52. The mirror driver's device object contains a generic pointer 53 to the mirror structure 54 that the mirror driver uses for keeping state information for the tape drives of the mirror set that the mirror device object represents. The mirror structure contains information about the state of the tape drives in the mirror set. The mirror structure also contains a list of pointers 62 to the tape drive control structures 56, 58, and 60. There is one tape drive control structure for each physical tape device in the mirror set, and there is a worker thread associated with each tape drive control structure. The worker threads are used to execute the I/O commands in parallel to all tape drives in the mirror set.

The mirror driver used in embodiments of the present invention, like other device drivers, handles three categories of I/O requests: reads, writes, and control requests. Read and write requests are typically asynchronous, and control requests are typically synchronous.

The mirror driver performs I/O operations with the tape devices in parallel. In order to accomplish this, as described above, the mirror driver uses a separate worker thread for each tape drive of a mirror set, which allows both synchronous and asynchronous I/O requests to be performed in parallel. The mirror driver performs I/O operations with a tape device by providing I/O request to the tape worker thread corresponding to the tape device. The tape worker thread then performs the I/O request, waits for the request to complete, and sets a control flag when the I/O request is complete. The mirror driver waits to receive a control flag from each of the tape worker threads before providing indication of the completion of an I/O request.

Figure 5:
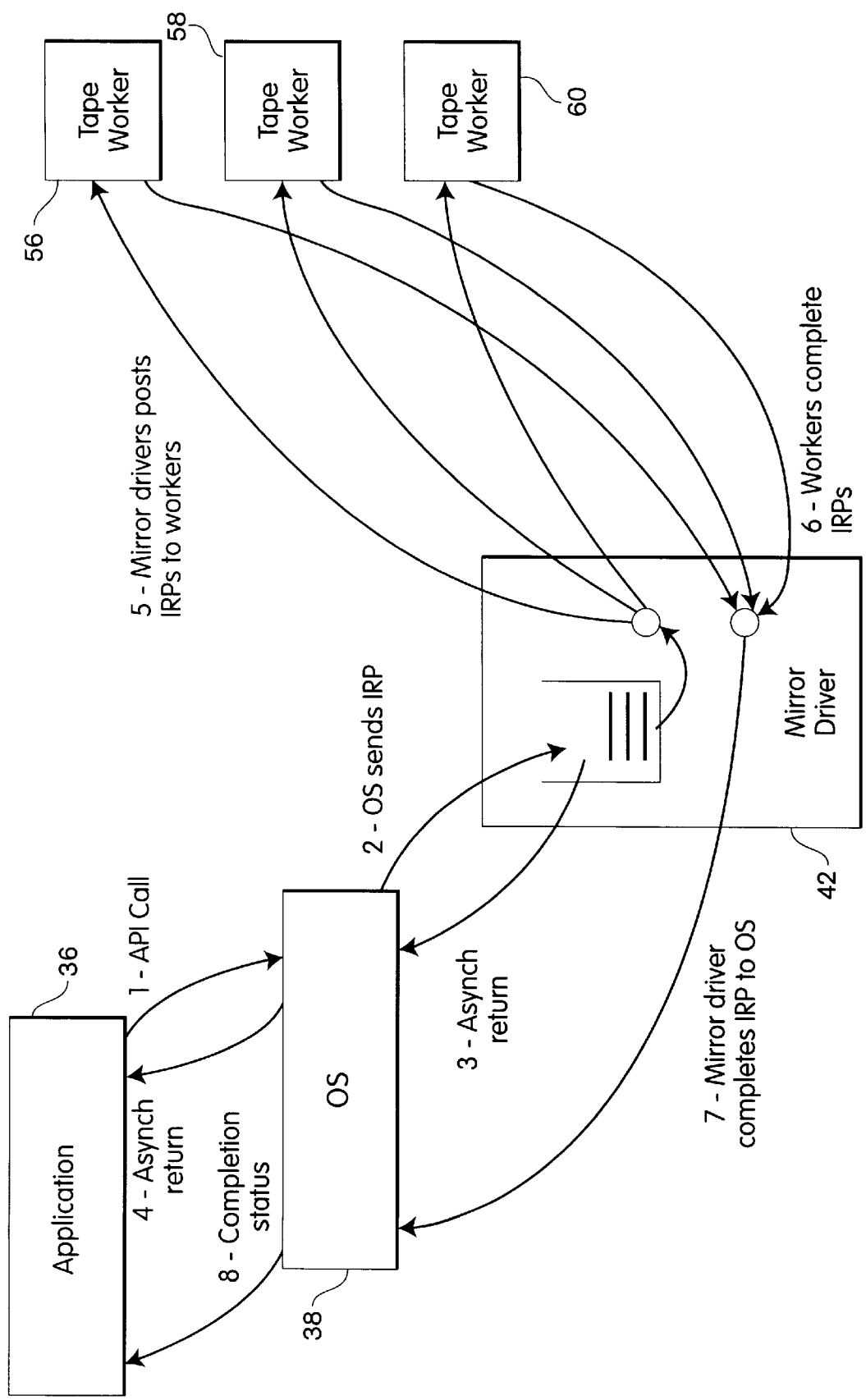
FIG. 5 is a functional block diagram of the data flow that occurs in one embodiment of the present invention.

The I/O request control flow for the mirror driver in accordance with one embodiment of the present invention will now be described with reference to FIG. 5. To access a mirror set of tape drives, the application 36 first (step 1) makes a call to the operating system API 38. The operating system converts the call from the application to an I/O request packet (IRP) (step 2) that is issued to the mirror driver 42. The mirror driver places the IRP in the mirror driver's I/O request queue. The mirror driver pulls requests from the queue in turn and performs the required processing for the request. If, for example, the request should be sent in parallel to all tape devices in the mirror, the driver makes a copy of the IRP for each tape worker thread, and submits the IRP to each tape worker thread (step 5). The tape worker threads can handle only one request at a time. As each worker thread completes a request, it calls a callback routine in the mirror driver (step 6). The callback routine counts how many of the pending requests submitted to the worker threads have completed. When all pending requests have completed, the mirror driver pulls the IRP from the front of the queue, performs the required completion processing and passes the completed IRP back to the operating system (step 7). The mirror driver's queue is then checked to see if another request can be started.

The mirror driver's request queue allows asynchronous requests to stack up. This allows applications that take advantage of the asynchronous features of drivers to pipeline their tape accesses. When an asynchronous request is received, the mirror driver returns control (step 3) after the request has been placed in the mirror driver's queue. When the I/O processing for the I/O request is complete, the request is completed and given back to the operating system. This results in the application being notified that the asynchronous request has completed.

The Windows NT operating system, used in embodiments of the present invention, uses a structure called an I/O request packet, or IRP to issue I/O requests to drivers. The IRP contains information such as what type of I/O request is being issued, memory management information for the driver, status and state fields. The IRP is also used to pass control and status information back to the operating system from drivers. The IRP has fields that a driver can use for its own purposes. In one embodiment of the present invention, the mirror driver uses one such field to keep state information about the IRP during processing by the worker threads using three variables, identified as MirrorState, IrpCount, and Active. MirrorState indicates the processing state of the mirror driver for the I/O request. IrpCount indicates the number of outstanding I/O requests to tape drives of a mirror set for an I/O request. The variable Active indicates if the I/O request is currently being processed by the mirror driver.

The method for handling I/O requests by the mirror driver in accordance with one embodiment of the present invention will now be more specifically described. As was mentioned earlier, there are three forms of I/O requests, read, write and control, of which, control I/O requests have the simplest control flow. Each type of I/O request is discussed separately below, with the process for handling control requests being discussed first. When the mirror driver receives an I/O request from the operating system, it first determines what type (i.e., read, write or control) of request has been received. If the mirror driver determines that the request is a control request, it calls a routine MirrorDeviceControl to handle the request.

Figure 6:
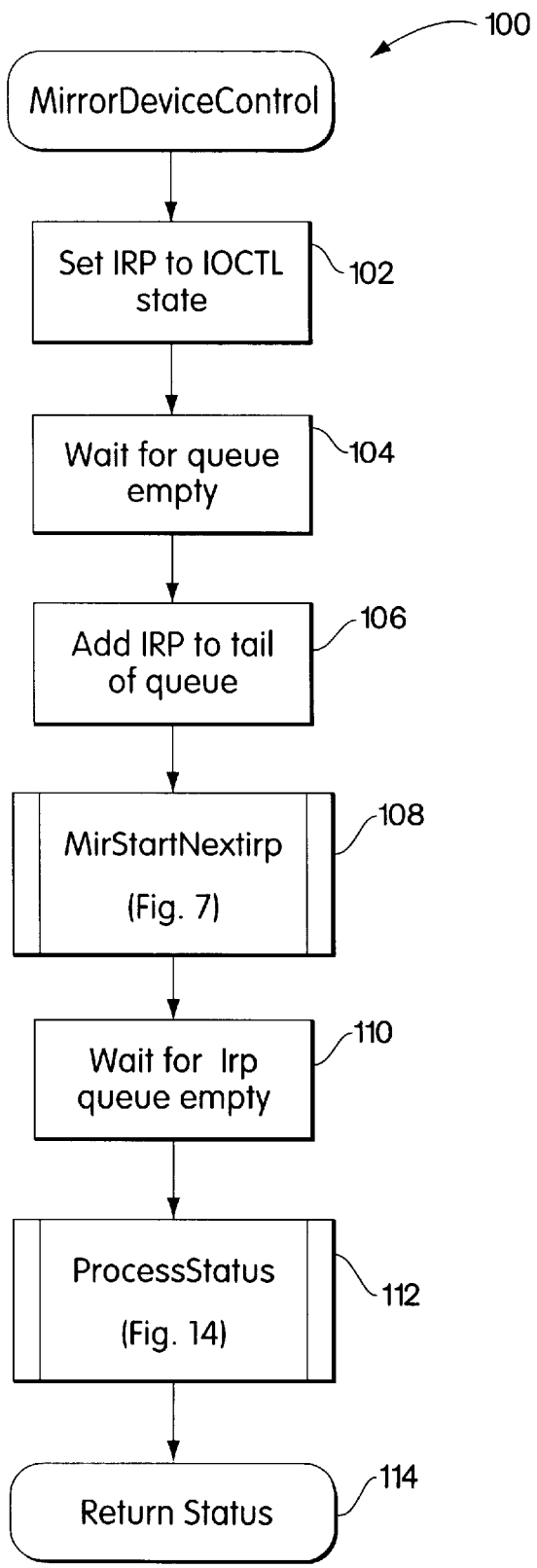
FIG. 6 is a flow chart of a routine MirrorDeviceControl in accordance with one embodiment of the present invention.

The routine MirrorDeviceControl 100 will now be described with reference to FIG. 6. In a first step 102, MirrorDeviceControl sets the variable MirrorState of the IRP to the IOCTL state, indicating that the IRP is a control IRP. Next, in step 104, MirrorDeviceControl waits for the mirror driver's I/O request queue to empty, to ensure that all prior I/O requests to the mirror driver are completed prior to executing the present I/O control request. MirrorDeviceControl then (step 106) adds the present IRP to the mirror driver's queue and calls (step 108) a routine MirStartNextIrp, which is a routine that checks the mirror driver's queue, and starts I/O processing for the IRP at the front of the queue if there is not an IRP currently active. MirrorDeviceControl then waits (step 110) for the queue to go empty, indicating that the IRP has been processed. MirrorDeviceControl then calls a routine MirProcessStatus 112 to check the status back from all of the tape drives in response to the IRP. The IRP is then completed and sent back to the operating system (step 114), using the status returned from MirProcessStatus.

Figure 7:
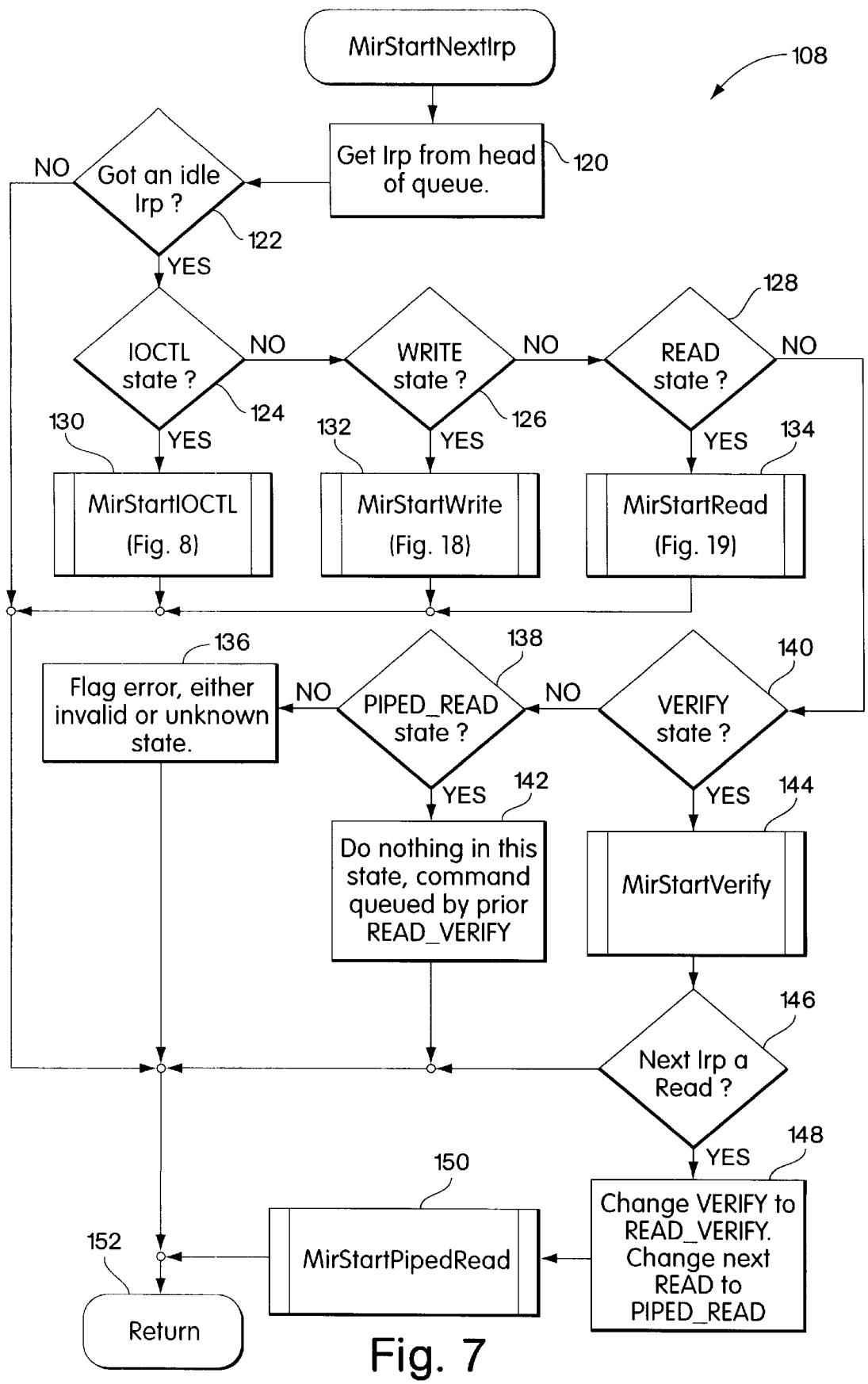
FIG. 7 is a flow chart of a routine MirStartNextIRP in accordance with one embodiment of the present invention.

The routine MirStartNextIrp will now be further described with reference to FIG. 7. In a first step 120, MirStartNextIrp retrieves the IRP in the front of the mirror driver's queue, and then determines, in step 122, if the IRP is idle (meaning that it is not currently being executed by the mirror driver) by checking the variable Active. MirStartNextIrp then checks the state of the IRP in steps 124, 126 and 128. Depending on the state of the IRP, one of three routines MirStartIoctl, MirStartWrite, or MirStartRead is called. When the IRP is in the IOCTL state, MirStartIoctl is called.

Figure 8:
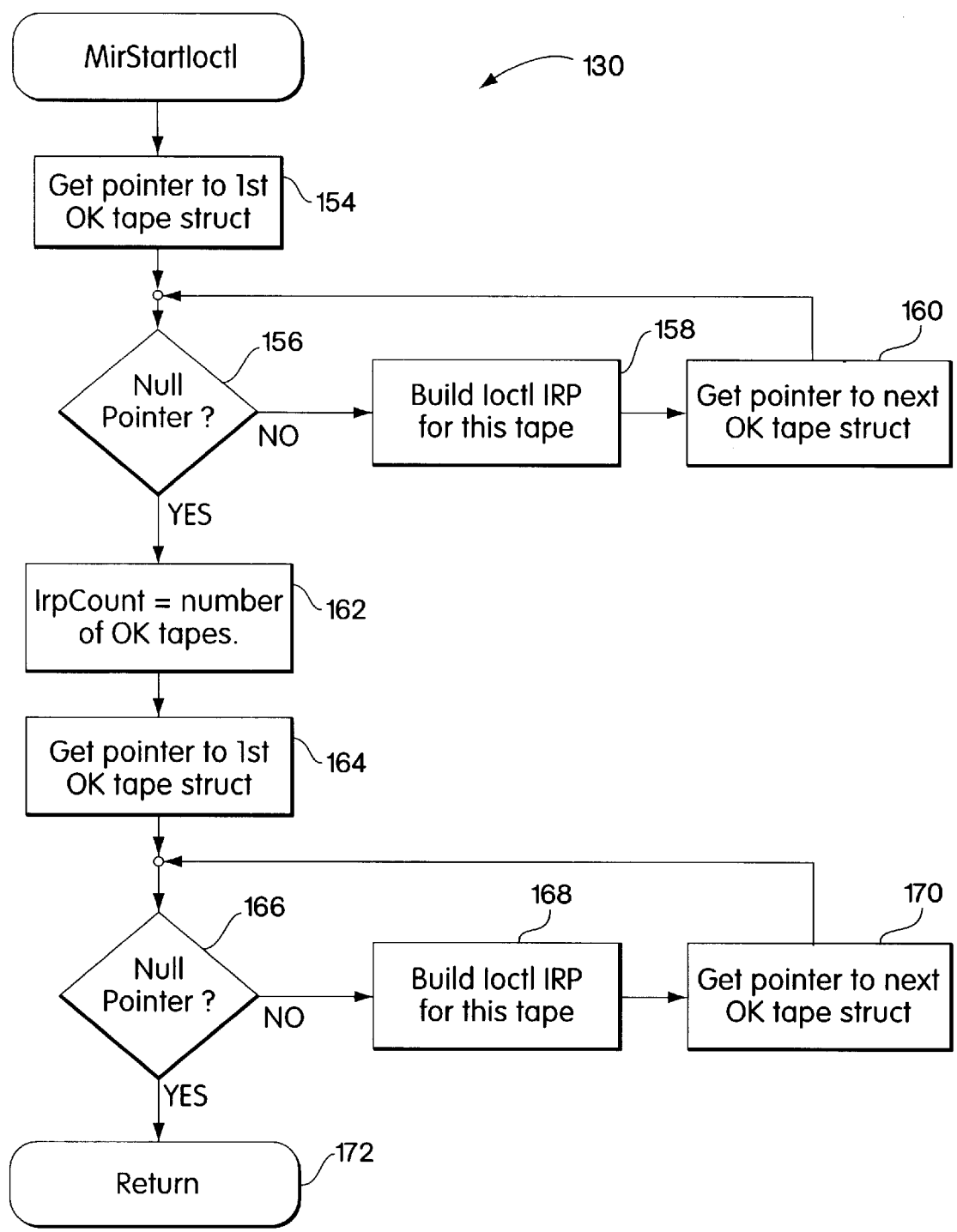
FIG. 8 is a flow chart of a routine MirStartIoctl in accordance with one embodiment of the present invention.

The routine MirStartIoctl will now be further described with reference to FIG. 8. In steps 154, 156, 158 and 160, a copy of the original I/O control IRP is built for every "OK" tape drive. An "OK" tape drive is defined as a tape drive that is in the mirrored set and has not had an error indication. Next, in step 162, the variable IRPCount is set equal to the number of "OK" tape drives, and in steps 164, 166, 168 and 170, one IRP is posted to each "OK" tape drive worker thread. Once all the IRPs have been posted, MirStartIoctl returns to MirStartNextIRP (step 172) and MirStartNextIRP returns back to MirrorDeviceControl (step 152), to wait until the mirror driver's queue is empty again, indicating that the processing for the present IRP is complete.

Figure 9:
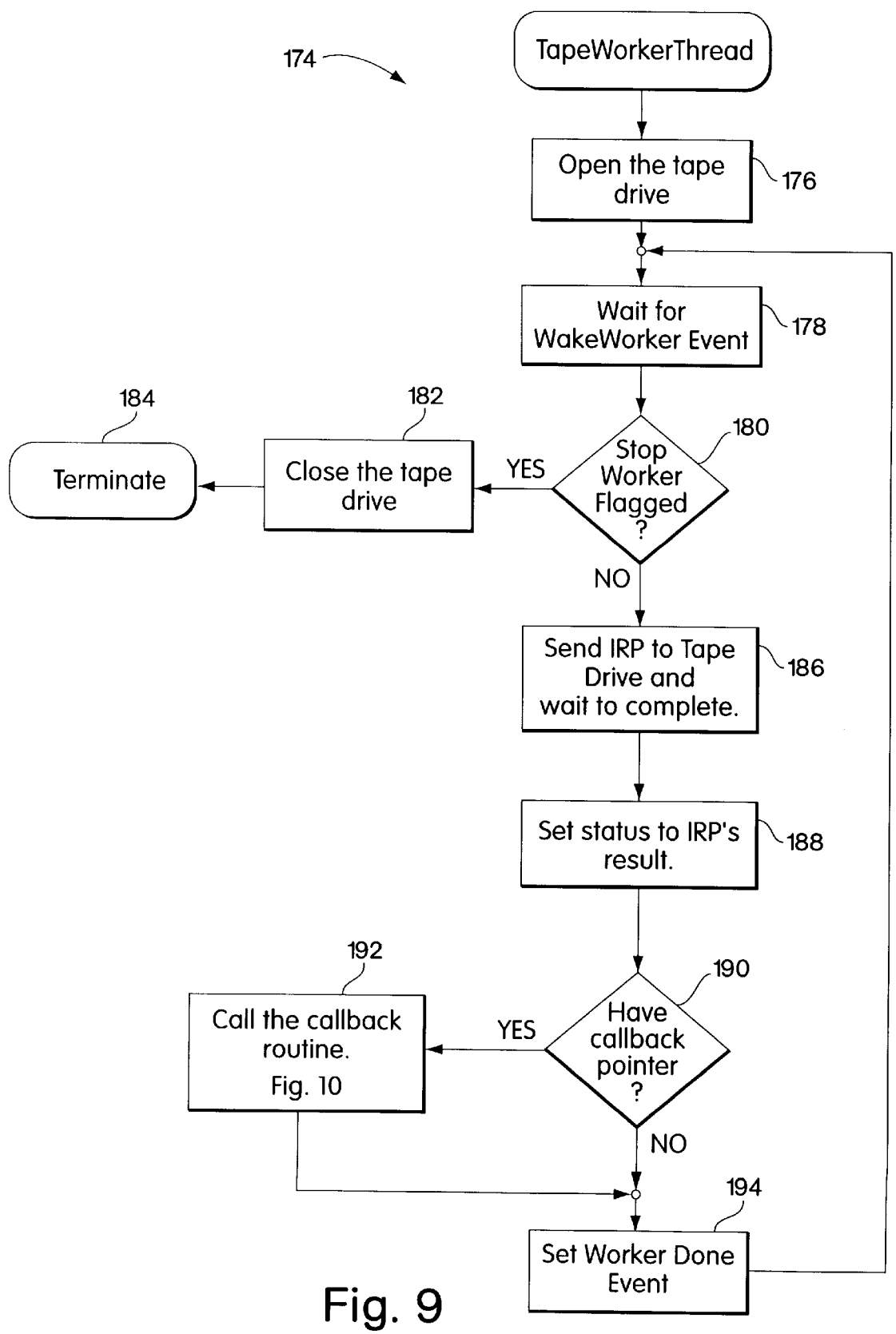
FIG. 9 is a flow chart demonstrating the process used by tape worker threads to process I/O requests in accordance with one embodiment of the present invention.

As discussed above, there is one tape structure and one tape worker thread for every tape drive in a mirror set. FIG. 9 shows the processing flow 174 for a tape worker thread. The processing flow 174 is started when the mirror driver is opened by the operating system. In step 176, the worker thread opens its corresponding tape drive. Next, in step 178, the worker thread waits for a wake worker event, which is the event that is set when the mirror driver gives the worker thread an I/O command to perform (i.e., step 168 of FIG. 8), or when the mirror driver wants to shut down the worker thread.

When the worker thread gets a wake worker event, it checks (step 180) to see if the stop worker flag is set. A stop worker flag indicates that the worker thread should close its tape drive and shut down. This action is taken when the mirror is closed by the application. If the stop worker flag is set, the worker thread closes (step 182) the tape drive and terminates (step 184) the tape worker thread process for this tape drive. If the stop flag is not set, then in step 186 the worker thread sends a new IRP to the tape drive and waits for it to complete. Then in step 188, the worker thread updates it's status with the result of the I/O operation. The worker thread then checks (step 190) to see if it has a callback pointer routine to call. If the worker thread has a callback routine to call, it calls the routine in step 192. Then it sets a worker done event (step 194) to signal that it has completed the IRP. The worker thread then returns to step 178 and waits for the next request.

In one embodiment of the present invention, the mirror driver always sets up the tape worker thread to call the callback routine MirCallback. The routine MirCallback 196 will now be described with reference to FIG. 10. The routine MirCallback starts in step 198 by decreasing the value of variable IrpCount by one and then checks (step 200) to see if the value of IrpCount is equal to zero. If the value of IrpCount is not zero, it indicates that some of the tape worker threads have not completed the I/O operation for this IRP, and in this case, MirCallback returns (step 202) without performing any further processing. When the value of variable IrpCount reaches zero, it indicates that all the tape worker threads have completed their I/O operation for this IRP, and that processing for the IRP has completed.

In steps 204, 210, 214 and 218, the state of the IRP is determined. In the case of an I/O control IRP, the IRP is in the IOCTL state, and for this state, MirCallback clears the status (step 206) in the IRP and removes the IRP from the mirror driver's queue (step 208), causing the queue to become empty. If the IRP is in a state other than the IOCTL state, then one of three routines, MirWriteCallback, MirReadCallback, or MirVerifyCallback will be called. These three routines are described in greater detail further below with reference to FIGS. 11, 12 and 13.

When the control IRP is removed from the mirror driver's queue, and the queue becomes empty, routine MirrorDeviceControl which was waiting at step 110 (FIG. 6) will process the status returned from the tape drives (step 112) and complete the I/O request to the operating system (step 114). The status is processed using the routine MirProcessStatus which will now be described with reference to FIG. 14. MirProcessStatus is used to check the status returned from all the tape drives and decide which, if any, tape drives should be failed out of the mirror set, and what status should be returned for the IRP. MirProcessStatus uses 3 flags, allSame, gotOK, and gotEom for indicating status. Flag Allsame is used to indicate that all of the tape drives in the mirror set have returned the same status. Flag gotOK is used to indicate that at least one tape drive returned good status, and flag gotEom is used to indicate that at least one tape drive encountered the end of the media. In step 232 of routine MirProcessStatus, flag AllSame is initialized to TRUE, and flags GotOK and GotEom are initialized to FALSE.

Figure 14:
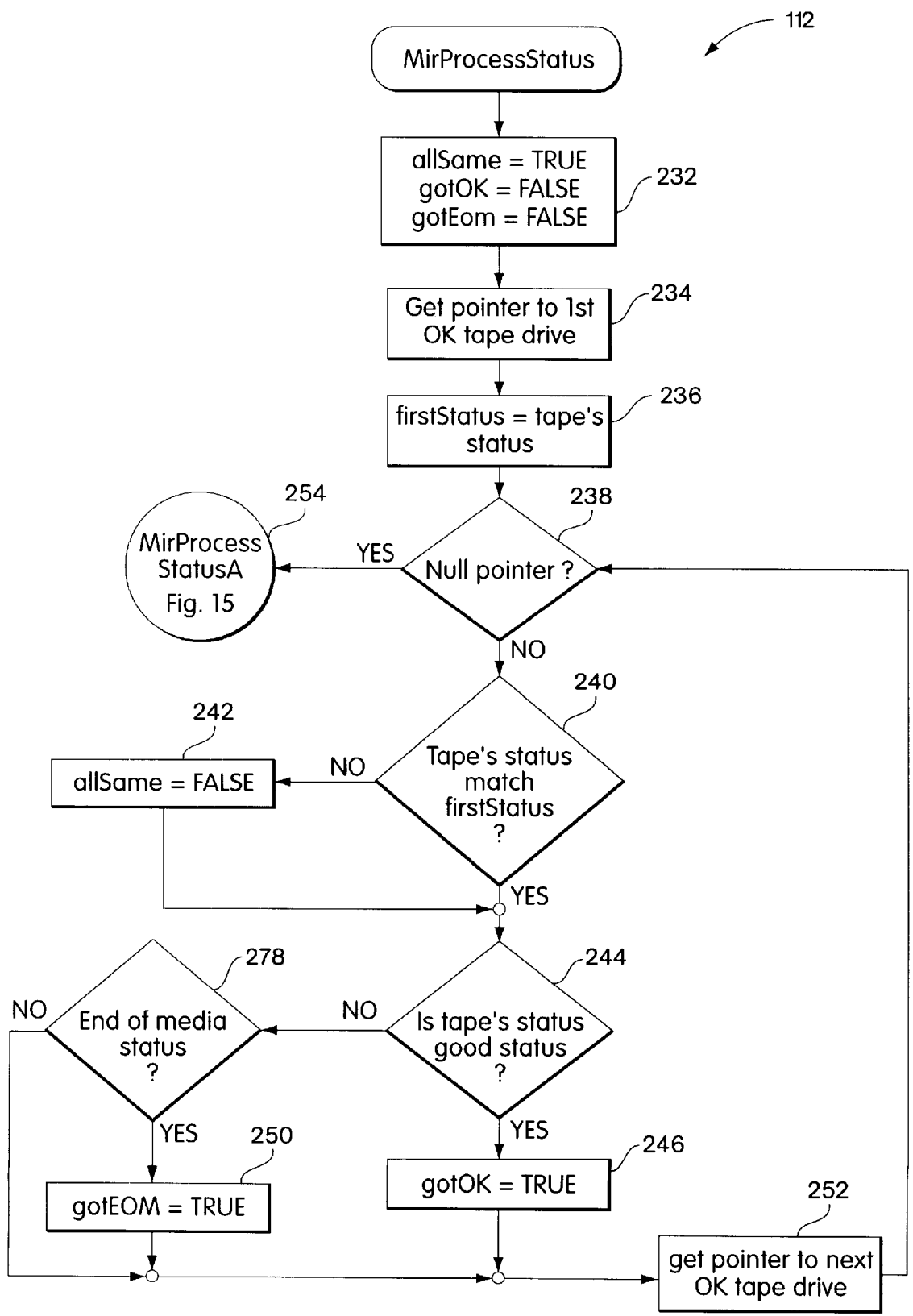
FIG. 14 is a flow chart of a routine MirProcessStatus in accordance with one embodiment of the present invention.

As shown in steps 238–252 in FIG. 14, MirProcessStatus loops through all of the tape drives flagged as OK in the mirror set. While looping through the drives, the status from the current drive is compared to the status returned by the first drive. If they do not match, the allSame flag is set to FALSE. Then the status from the current drive is checked to see if it is good status. If it is good status, the gotOK flag is set to TRUE. If the status is not good, it is checked to see if it is "end of media" status. If it is "end of media" status, gotEom is set to TRUE. When the status from all the tape drives has been checked, the result of decision block 238 will be YES, and the routine MirProcessStatus continues at step 254, MirProcessStatusA, which is described in greater detail in FIG. 15.

In a first step 256, MirProcessStatusA checks if the allSame flag is TRUE. If the result of step 256 is YES, then in step 280, status is set to the status returned by all of the drives, and the routine returns. If the status of all drives is not the same, the gotOK flag is checked in step 258 to see if at least one of the drives returned good status. If the gotOK flag is TRUE, then at least one tape drive successfully completed the I/O command, and all the drives are looped through again, and their returned status is checked in steps 260 to 266. Any tape drive that did not return status of either OK or end of media is failed out of the mirror set in step 268.

After all of the tapes have been checked, the flag gotEOM is checked in step 270 to determine if any of the drives have returned end of media status. If any have, the return status is set to end of media status in step 272, otherwise the returned status is set to OK in step 274. Thus, the mirror driver returns end of media status if any of the tape drives in the mirror set return end of media status, and if none of the tape drives return end of media status, then the return status is set to good status.

Figure 15:
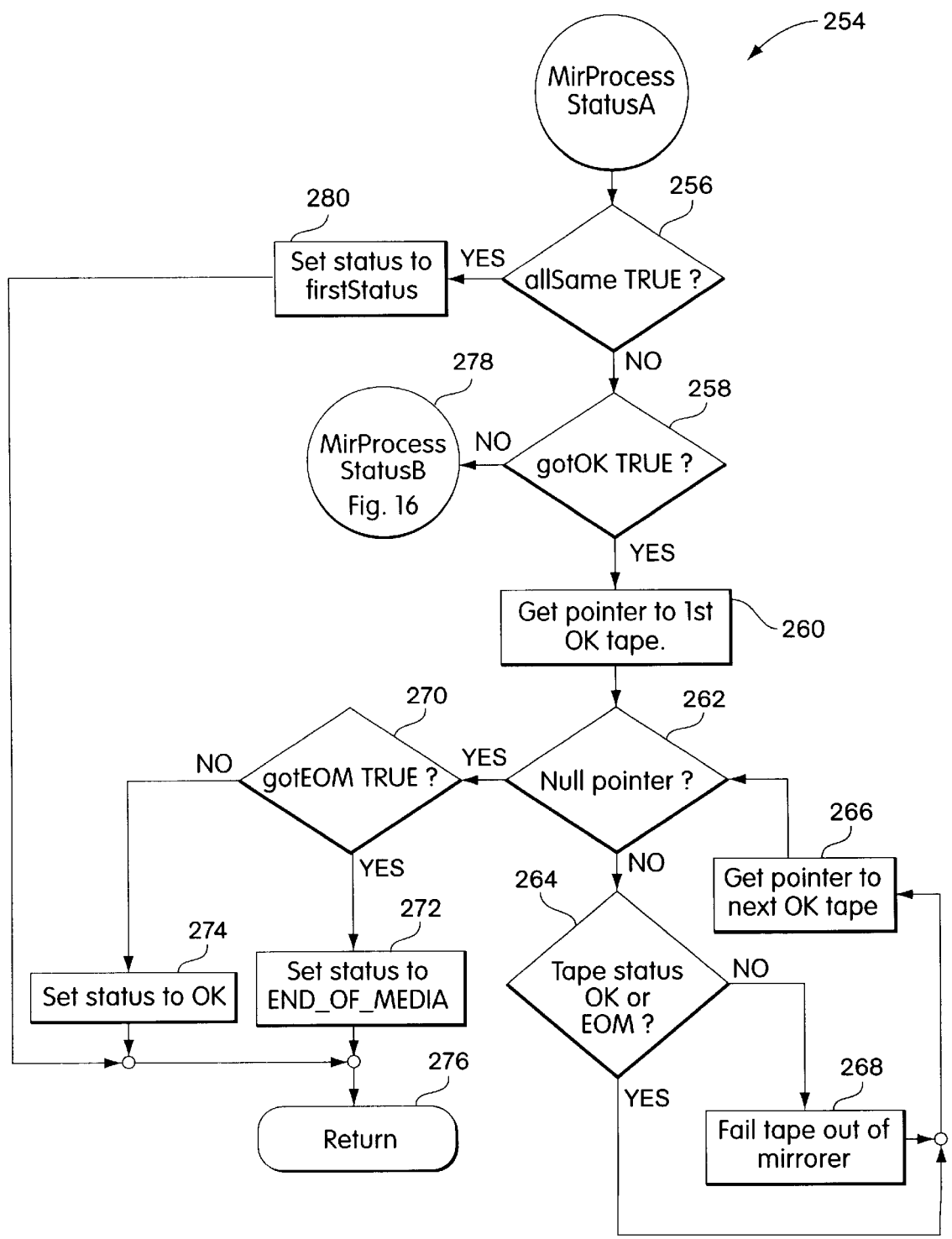
FIG. 15 is a flow chart of a routine MirProcessStatusA in accordance with one embodiment of the present invention.
Figure 16:
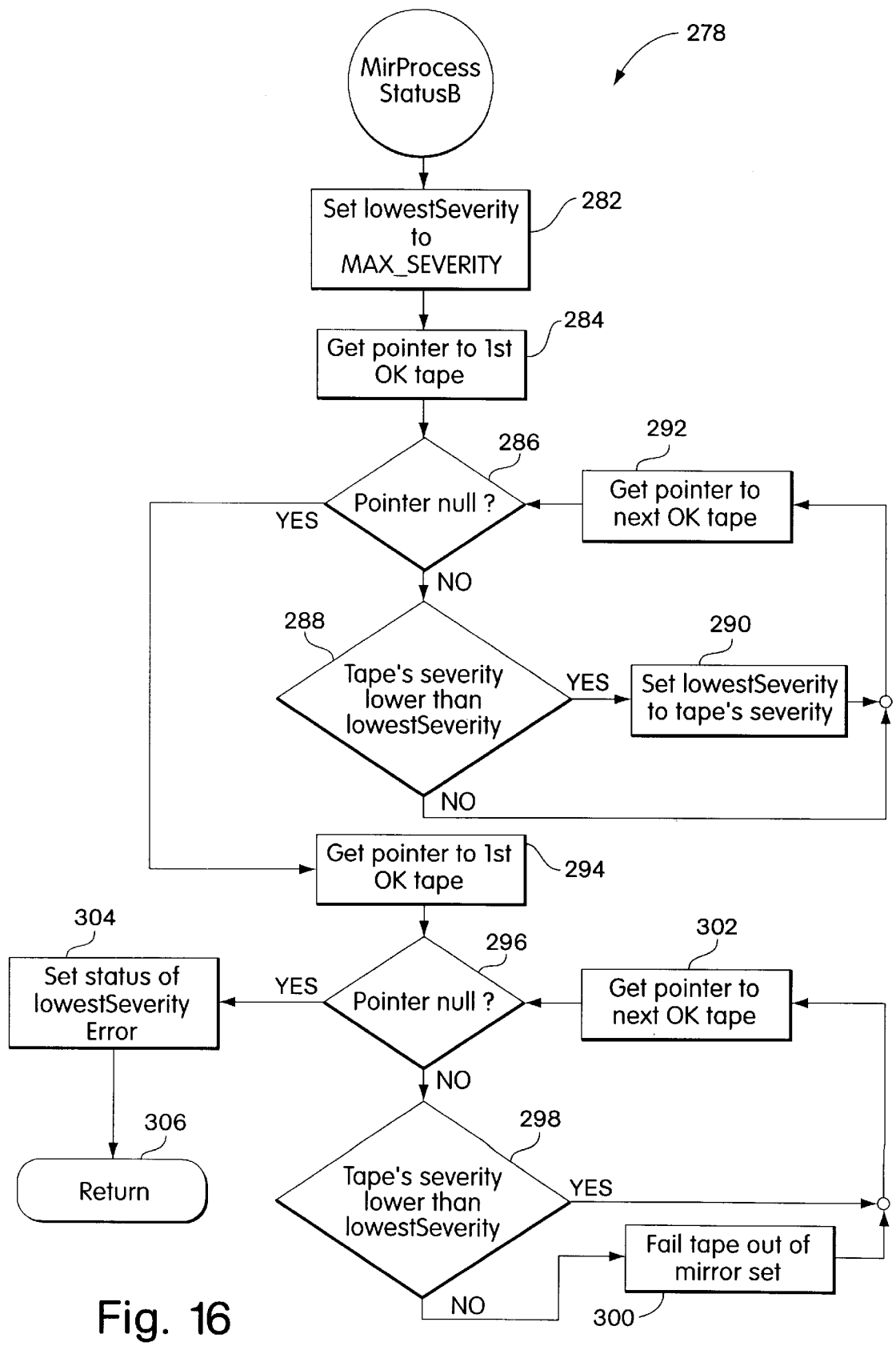
FIG. 16 is a flow chart of a routine MirProcessStatusB in accordance with one embodiment of the present invention.

At step 258 in FIG. 15, if none of the tape drives reports OK status, then in step 278, another routine called MirProcessStatusB is called. MirProcessStatusB is used to determine the lowest severity error returned by the tape drives. The routine MirProcessStatusB will now be described in greater detail with reference to FIG. 16. In step 282, a variable lowestSeverity is set to MAX_SEVERITY and in steps 284–292, the status of all tape drives is again reviewed, and the variable lowestSeverity is set equal to the status of the tape drive having the least severe error. Then, in steps 294 to 304, any tape drives having a status more severe than the tape drive having the least severe status are failed out of the mirror. The routine returns at step 306 with the return status set to the least severe error value.

Using the above routines, the status returned to the application at the completion of an I/O request is set to: "OK" if at least one tape drive is "OK" and none of the tape drives is at the end of the media; "End of Media" if at least one tape drive is "OK" and at least one tape drive is at the end of the media; and if none of the tape drives is "OK", the status returned will be the status of the tape drive having the least severe error status. As discussed above, the mirroring operation is transparent to a backup application, and accordingly, the status returned to the backup application represents essentially a summary of the status of all tape drives in the mirror set. As understood by those skilled in the art, other schemes for summarizing the status of the tape drives in the mirror set can also be used.

Write I/O requests from a backup application are processed in a manner that is very similar to control I/O requests discussed above. The main difference is that write requests are performed asynchronously, and control is returned to the operating system prior to completion of the write request by the mirror driver. When a write I/O request is received by the mirror driver, a determination is first made that the request is a write I/O request, then the mirror driver starts processing the write I/O request using the steps shown in FIG. 17. Read I/O requests and write I/O requests are initially processed in the same manner, using the steps shown in FIG. 17. In a first step 312, the front of the mirror driver's queue is checked to see if there is at least one IRP already in the queue. If there is, then in step 314, the IRP in the front of the queue is checked to see if it is the same type of I/O command as the present IRP. If they are different, the routine waits at step 316 for the queue to go empty before proceeding. If the present IRP and the queued IRP is the same type, then the routine continues without waiting. In one embodiment of the invention, multiple reads can be placed in the queue, or multiple writes can be placed in the queue, but a read will wait until all pending writes are completed, and a write will wait for all pending reads to complete.

In steps 318–324, the routine sets the state of the IRP to the appropriate state, either read or write, and adds the IRP to the queue. The routine then calls routine MirStartNextIrp 108 to begin processing the IRP, and returns (steps 326 and 328) status of PENDING to the operating system.

Control is returned to the operating system prior to completion of a write IRP. The status PENDING indicates to the operating system that this IRP will be completed later, allowing the operating system to support asynchronous I/O. The application can perform multiple writes to the mirror driver asynchronously, where they stack up in the mirror driver's queue to be processed in turn.

The routine MirStartNextIrp is called after adding an IRP to the queue, and is called after callback processing has completed. The operation of MirStartNextIrp, which is shown in FIG. 7, has been previously described for processing of a control IRP. When a write IRP reaches the head of the mirror driver's queue, MirStartNextIrp in step 126 determines that the IRP is in the WRITE state, and calls routine MirStartWrite 132.

Figure 18:
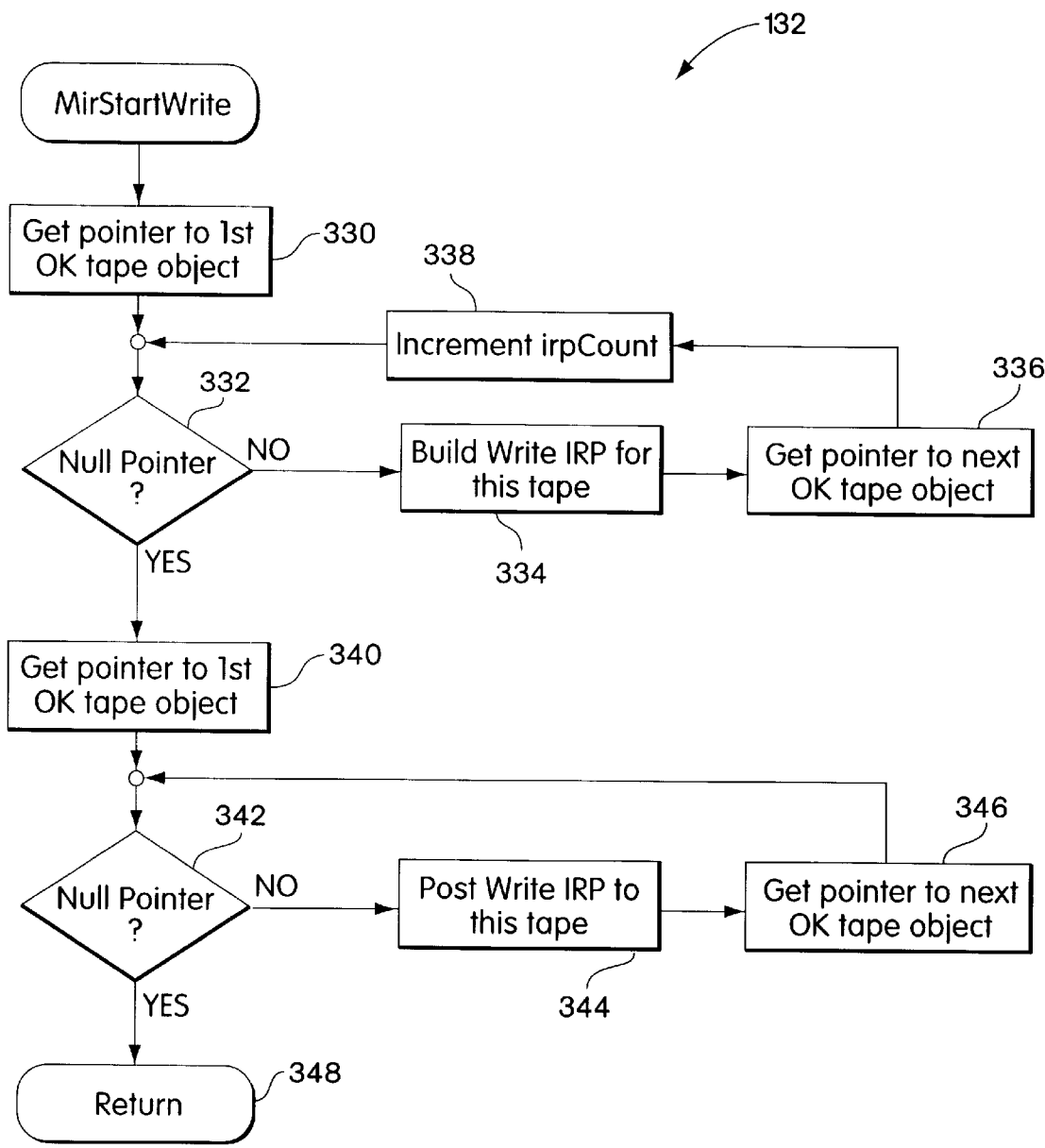
FIG. 18 is a flow chart of a routine MirStartWrite in accordance with one embodiment of the present invention.

MirStartWrite will now be described in greater detail with reference to FIG. 18. In steps 330 to 338, MirStart Write builds a write IRP for each "OK" tape drive in the mirror set, and sets the IRP count to the number of "OK" tape drives in the mirror set. Then, in steps 340–346, MirStartWrite posts one IRP to each tape drive worker thread and returns. As was explained earlier, and is shown in FIG. 9, each tape worker thread performs an I/O request, and when the I/O request is complete, the tape worker thread calls routine MirCallBack, which was described above with reference to FIG. 10. For a write IRP, MirCallBack calls MirWriteCallback 212.

Figure 11:
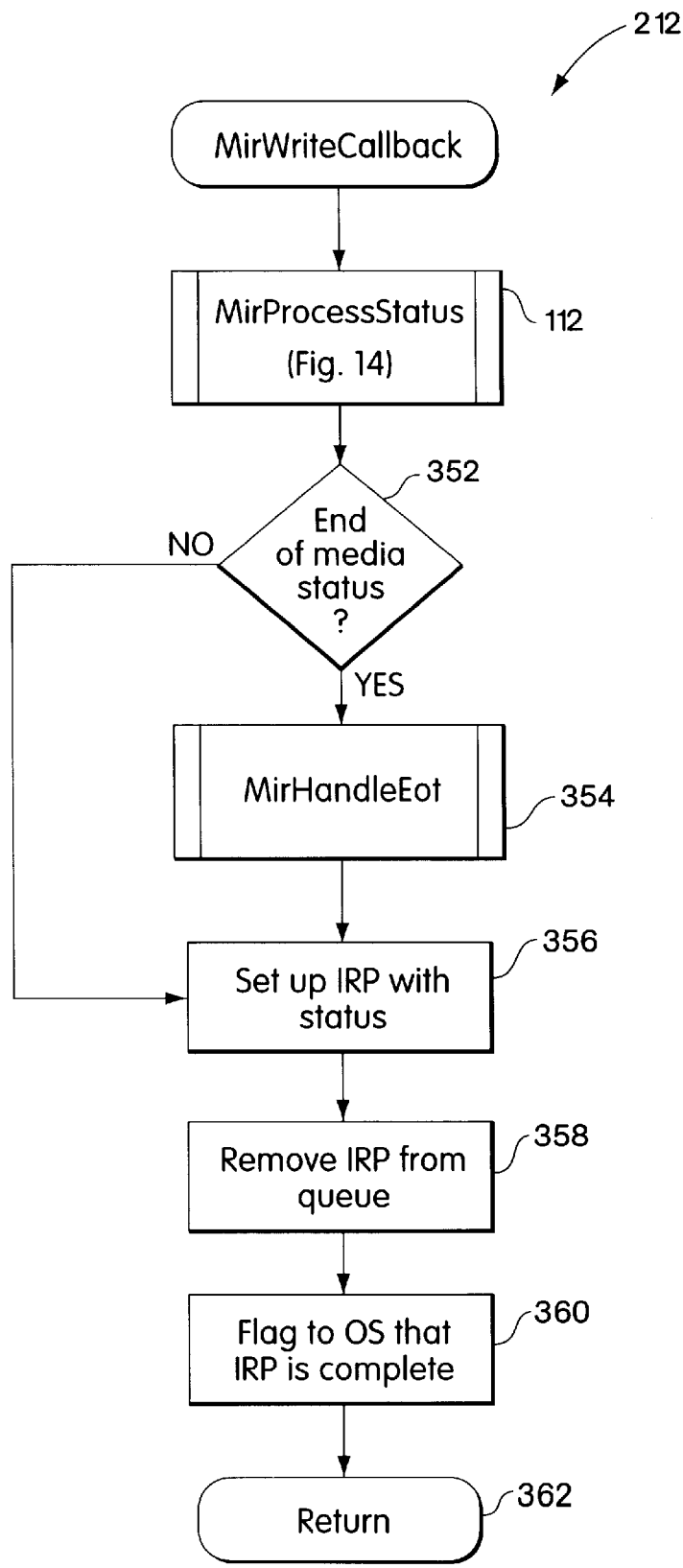
FIG. 11 is a flow chart of a routine MirWriteCallback in accordance with one embodiment of the present invention.

MirWriteCallback will now be described with reference to FIG. 11. MirWriteCallback calls MirProcessStatus 112 to check the status from all the tape worker threads, to fail out any tape drives from the mirror if required, and to determine the status for the present IRP. Then, in step 352, MirWriteCallback checks to see if the resultant status is end of media. If it is, a routine MirHandleEot 354, which is described below, is called. Then, in step 356, the IRP is set up with the status for the request, and in steps 358–362, the IRP is flagged as completed to the operating system and the routine returns to MirCallBack to process any remaining IRPs in the mirror driver's queue.

Figure 23:
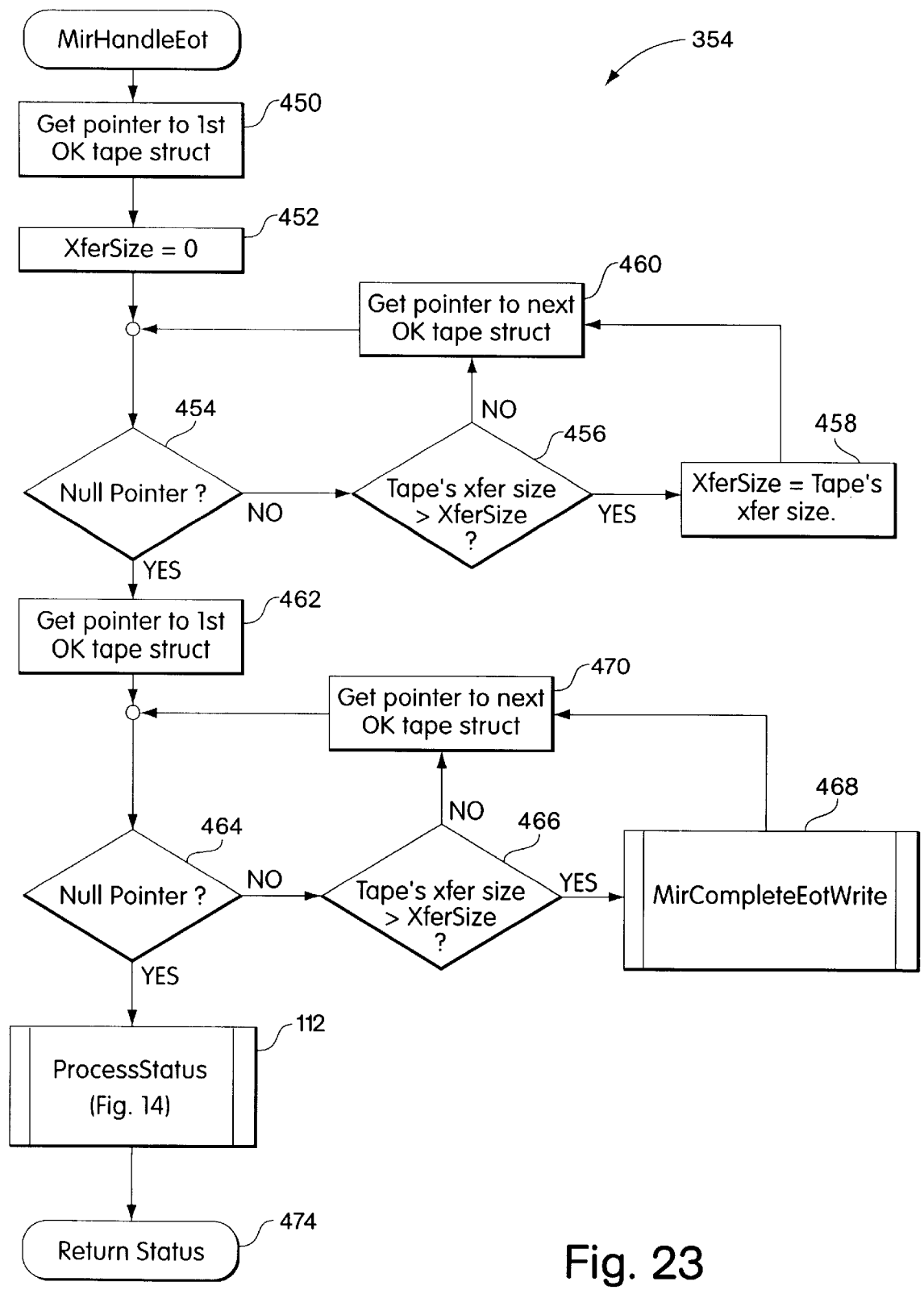
FIG. 23 is a flow chart of a routine MirHandleEot in accordance with one embodiment of the present invention.

MirHandleEot will now be described with reference to FIG. 23. MirHandleEot provides additional processing to account for the situation when the status is end of media, indicating that a tape in at least one of the tape drives has reached the logical end of the media. Typically, tapes have a buffer zone between the point at which the logical end of media occurs and the physical end of the tape. The process MirHandleEot utilizes a portion of this buffer zone to write additional data on a tape that has reached the logical end of the media prior to completing all data for a given write command. Tape drives typically truncate the data to be written to a tape when a logical end of tape is reached and report back that fewer bytes than requested were written to the tape.

In steps 450 to 460, MirHandleEot scans all of the OK tape drives in the mirror set to determine which tape drive transferred the most data, and sets a variable XferSize equal to the amount of data transferred to this tape drive. Next, in steps 462 to 470, MirHandleEot calls a routine MirCompleteEotWrite 468 to complete the writing of data to any tape drive that received an amount of data less than the value of the variable XferSize. MirHandleEot then checks the status using routine ProcessStatus 112 as previously described above, and then returns the status in step 474.

Figure 24:
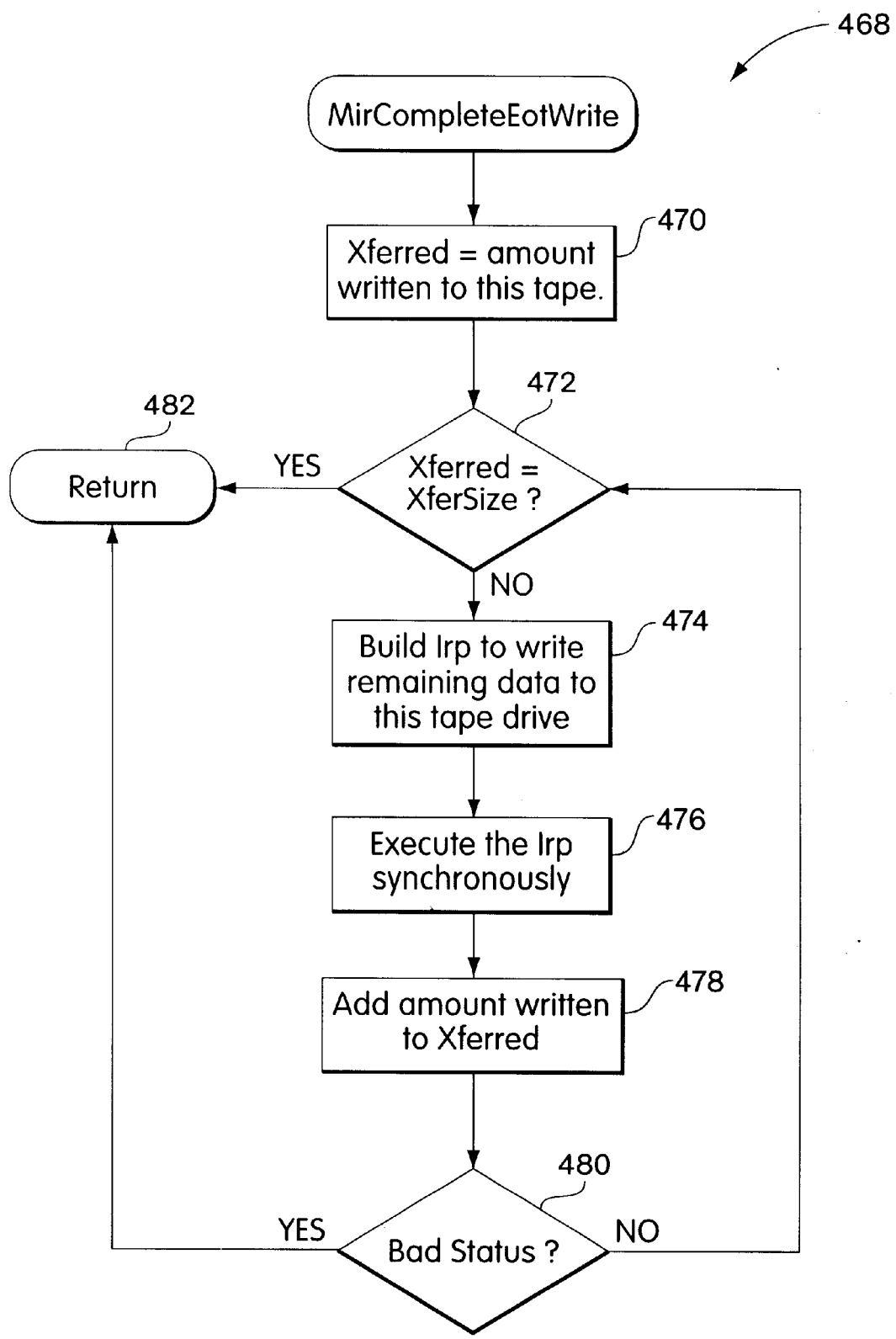
FIG. 24 is a flow chart of a routine MirCompleteEotWrite in accordance with one embodiment of the present invention.

MirCompleteEotWrite 468 will now be described with reference to FIG. 24. In a first step 470, MirCompleteEotWrite sets a variable Xferred equal to the amount of data transferred to the current tape drive. Next, in steps 472 to 480, MirCompleteEotWrite builds an IRP and writes any remaining data to the current tape drive, and adds the amount written to Xferred. The status of the current tape drive is then checked in step 480. If the status is "Bad", then process MirCompleteEotWrite ends at step 482. Otherwise, the value of Xferred is compared with the value of variable XferSize, and if they are equal, then all data was written and MirCompleteEotWrite ends. If they are not equal, then steps 474 to 480 are repeated until they are equal or until "Bad" status is returned.

Figure 17:
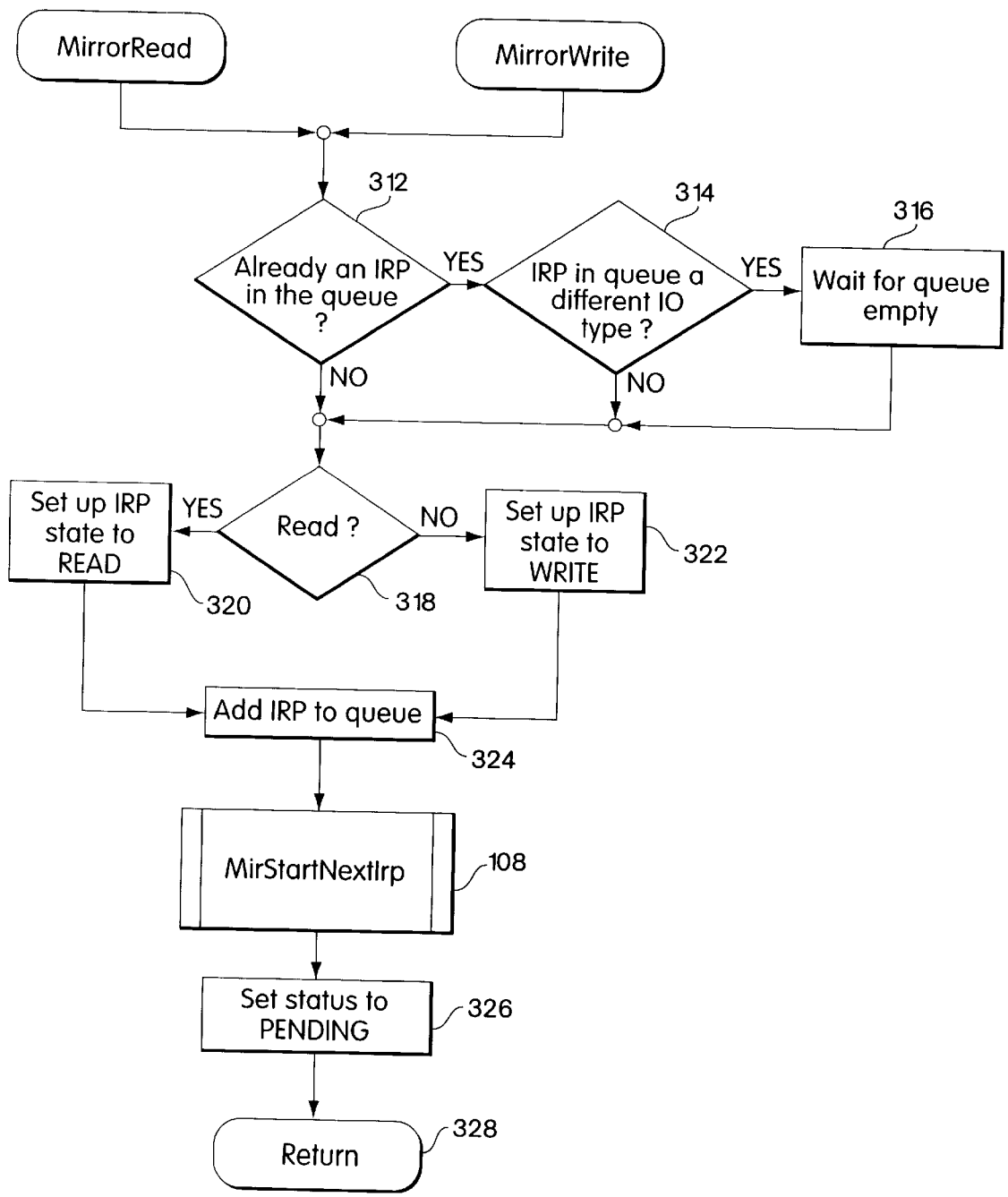
FIG. 17 is a flow chart of a routines MirrorRead and MirrorWrite in accordance with one embodiment of the present invention.

When a read I/O request is received by the mirror driver, the steps shown in FIG. 17 are performed in a manner similar to that for a write I/O request discussed above. A read IRP is added to the mirror driver's queue, and MirStartNextIrp is called to process the queue. The status of the read IRP is then set to pending, and control is returned to the operating system. When all prior requests in the queue are completed, the read IRP will be at the front of the queue, and MirStartNextIrp will call MirStartRead 134 to begin processing this read IRP.

Figure 19:
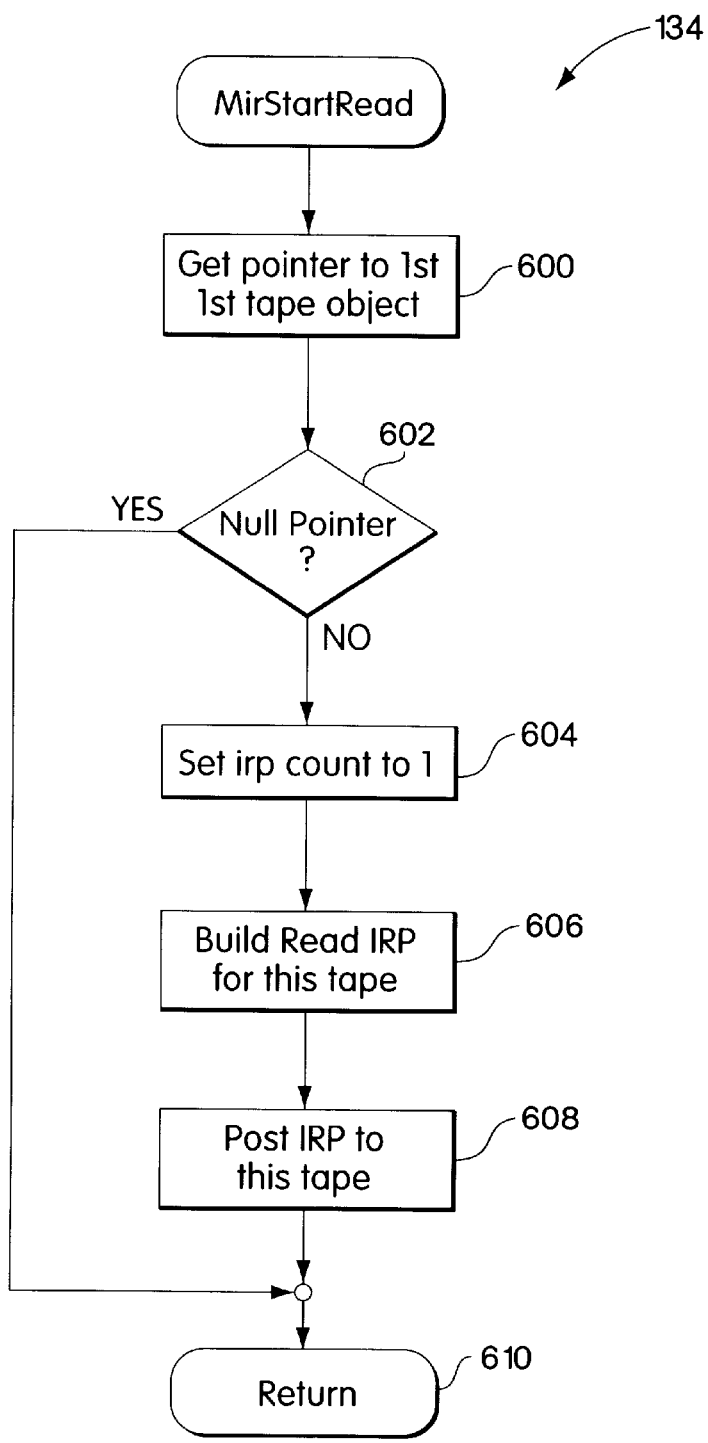
FIG. 19 is a flow chart of a routine MirStartRead in accordance with one embodiment of the present invention.

MirStartRead will now be described with reference to FIG. 19. Unlike the routine MirStartWrite, MirStartRead does not set up a request with all of the tape worker threads, but rather, sets up a read request with the first tape worker thread. MirStartRead in step 600 gets the pointer to the first tape drive, and in step 602 checks if the pointer is a null pointer. The pointer is not normally a null pointer when this routine is called. If the pointer is a null pointer, this indicates that there is either a problem with the mirror driver or that the mirror configuration is wrong, and MirStartRead ends. If the pointer is not a null pointer, the variable IRPCount is set to 1 in step 604. A read IRP is then built for the first tape drive in step 606, and the IRP is posted to the tape drive in step 608. As discussed above with reference to FIG. 9, when an IRP is posted to a tape drive, and the IRP is completed, the tape worker thread will call routine MirCallBack, which was described above with reference to FIG. 10. MirCallBack decrements the variable IRPCount by 1 so that it is equal to zero, determines that the IRP at the front of the queue is in the READ state, and calls routine MirReadCallback.

Figure 12:
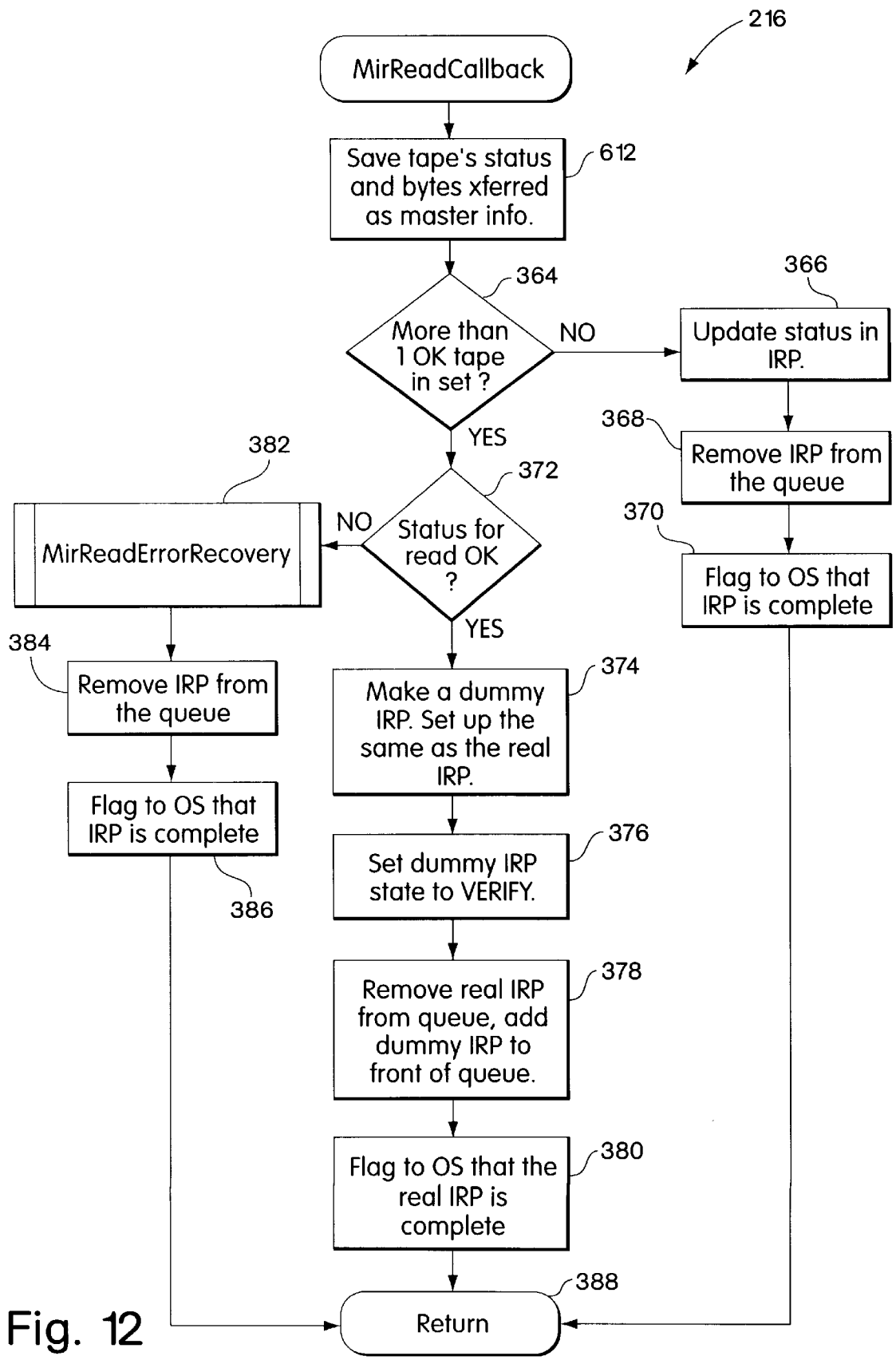
FIG. 12 is a flow chart of a routine MirReadCallback in accordance with one embodiment of the present invention.

MirReadCallback will now be described with reference to FIG. 12. MirReadCallback first saves (step 612) the status and byte count from the read of the first tape drive. MirReadCallback then determines in step 364 whether there is more than one "OK" tape drive in the mirror set. If there is only one "OK" tape drive, then in steps 366–370, the status of the present IRP is updated, it is removed from the mirror driver's queue, and a flag is sent to the operating system indicating that the IRP has completed. If there is more than one tape drive, then MirReadCallback checks the status (step 372) of the read to see if the status is "OK", indicating that the status is either successful or is an acceptable condition, such as filemarks, setmarks, or end of media. If the status is not "OK", a routine MirReadErrorRecovery 382 is called to handle the error condition. MirReadErrorRecovery is described further below. Then, in steps 384 and 386, the present IRP is removed from the mirror driver's queue, and a flag is sent to the operating system indicating that the IRP has completed.

If the status of the present IRP is "OK", then in steps 374 and 376 a dummy IRP is created having the same parameters as the read IRP, and having a state set to VERIFY. The read IRP is removed from the queue, and the dummy IRP is inserted at the front of the queue in step 378. The read IRP is then set up with the status from the read and flagged as complete to the operating system in step 380.

Once the read IRP is flagged as complete to the operating system, the application considers the read I/O request to be done. The dummy IRP, now at the front of the mirror driver's queue, is used to command reads to the remaining tape drives in the mirror set to place the media in the remaining tape drives in the same position as the media in the first tape drive, which was read in response to the read IRP. This allows the read to complete as soon as the first tape drive in the mirror completes the I/O command, rather than waiting for all tape drives to complete the I/O command. This reduces the performance degradation overhead incurred while doing mirrored reads.

When MirReadCallBack completes, it returns to the MirCallBack routine (FIG. 10), which checks (step 222) whether the state of the present IRP is READ_VERIFY. The state of the present IRP is not READ_VERIFY, so MirCallBack then calls MirStartNextIrp. The IRP at the front of the queue is now the dummy IRP having a state of VERIFY, so MirStartNextIrp determines (step 140) that the state is VERIFY and calls routine MirStartVerify 144.

Figure 20:
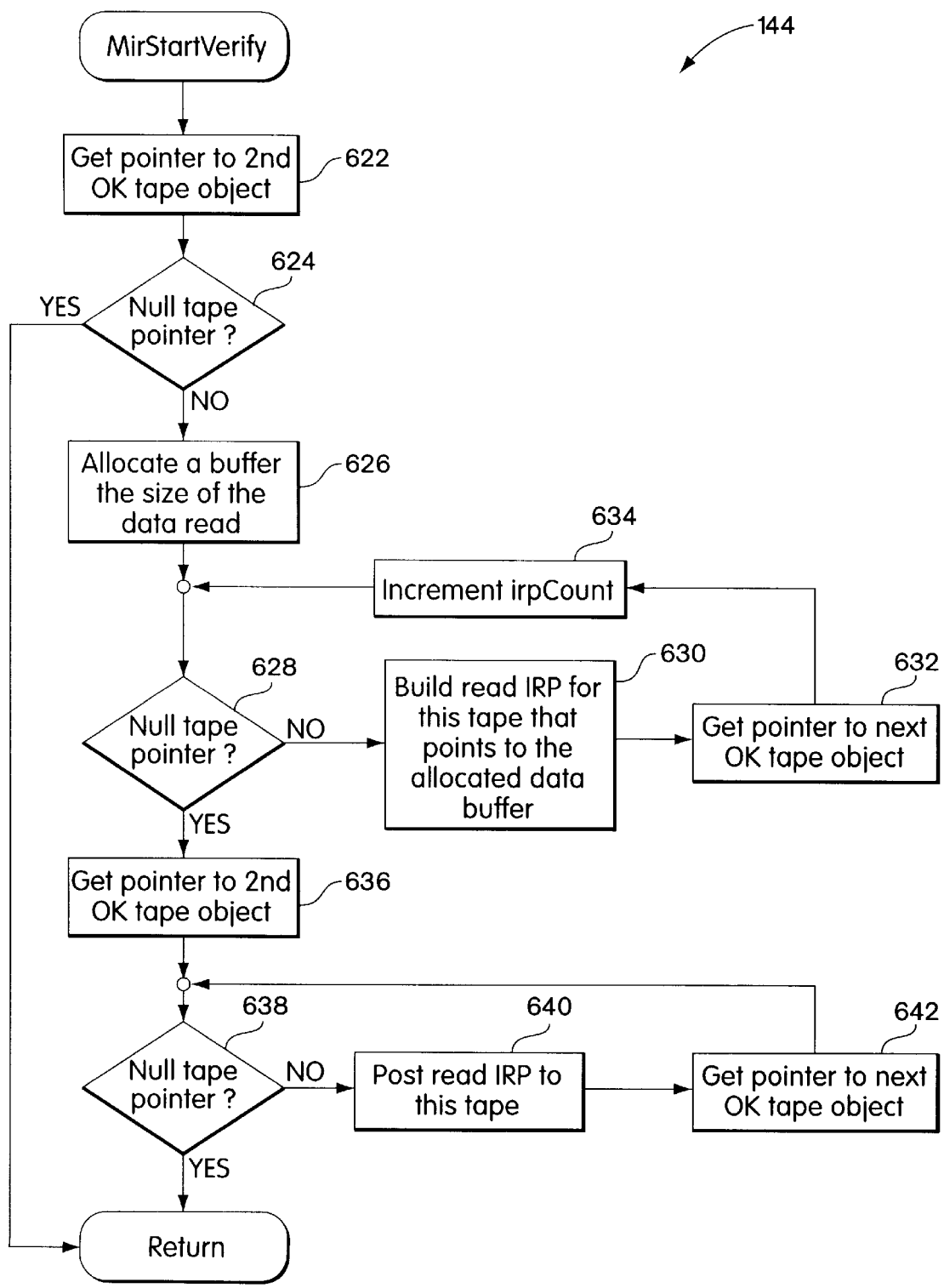
FIG. 20 is a flow chart of a routine MirStartVerify in accordance with one embodiment of the present invention.

Routine MirStartVerify will now be described with reference to FIG. 20. MirStartVerify first gets (step 622) a pointer for the second tape drive of the mirror set. Then, after determining (step 624) whether the pointer is a null pointer, MirStartVerify allocates (step 626) a buffer im memory of the computer system large enough to receive the read data, and then builds and starts a read IRP to all tape drives, except the first tape drive, in the mirror set. Since the application has already received the read data when the read to the first tape drive completed, data received as a result of the read requests to the remaining tape drives are all directed to this allocated buffer, which is deleted when all the reads complete. In one embodiment of the present invention, to conserve memory in the computer system, the space allocated for the buffer is large enough to receive the data from only one of the tape drives. Read data from the other tape drives overwrites any data in the buffer.

When routine MirStartVerify is started running, MirStartNextIrp (FIG. 7) then checks (step 146) to see if the next IRP in the mirror driver's queue is a read IRP. The first tape drive in the mirror set is now idle, and if there is a second read IRP in the mirror driver's queue, then the second read IRP can be posted to the first tape drive in parallel with the prior read that may still be completing to the other tape drives in the mirror set. If there is a second read in the queue, then in step 148 the dummy IRP in the front of the mirror driver's queue is changed from VERIFY state to READ_VERIFY state and the state of the read IRP which is next in the queue is changed from READ state to PIPED_READ. These states provide indication that the next read is being pipelined with the current verify. Routine MirStartPipedRead 150 is then called to start the second read request from the first tape drive.

Figure 21:
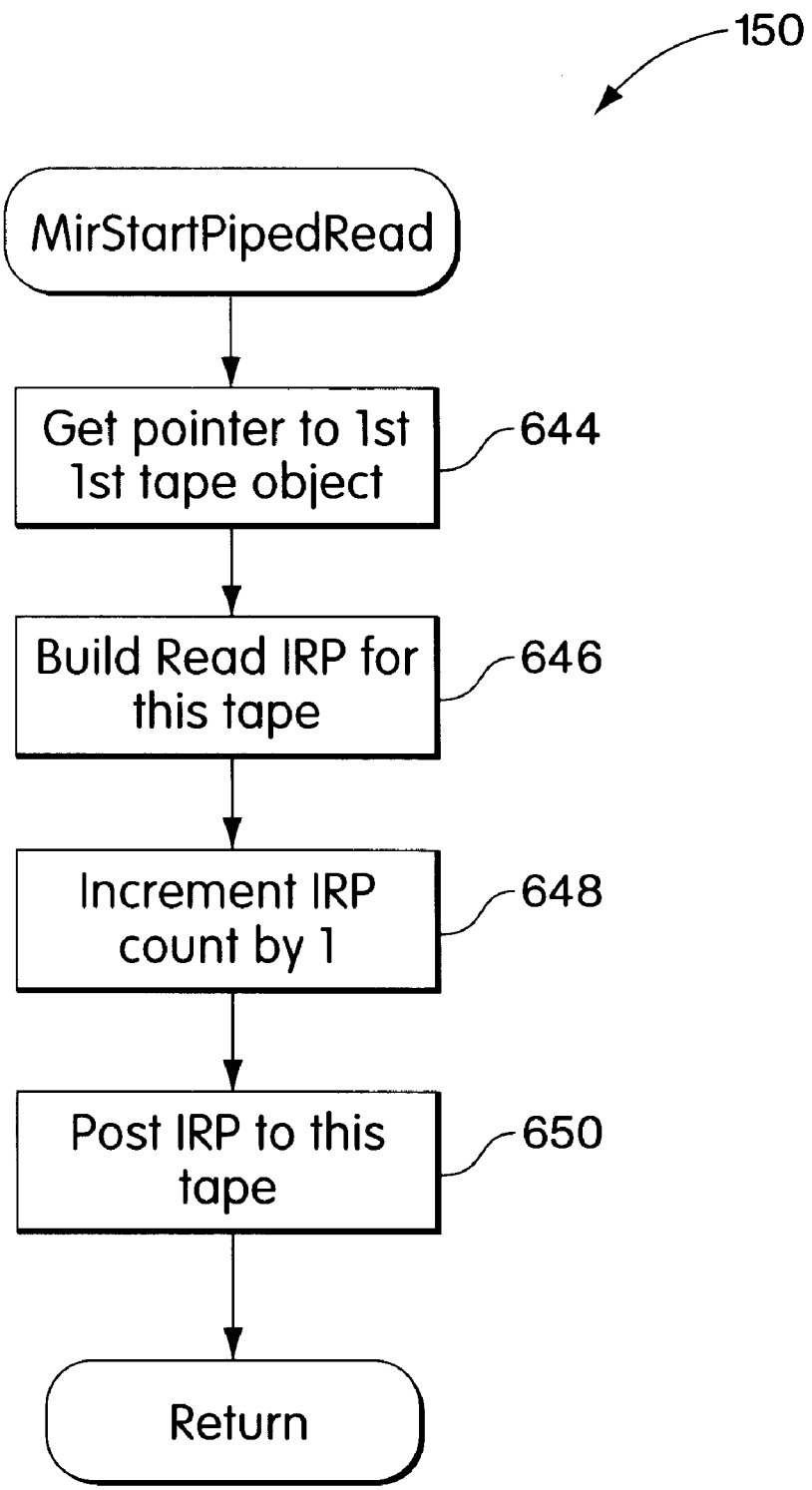
FIG. 21 is a flow chart of a routine MirStartPipedRead in accordance with one embodiment of the present invention.

MirStartPipedRead will now be described with reference to FIG. 21. MirStartPipedRead operates similar to MirStartRead to read data from the first tape drive in steps 644 to 650. MirStartPipedRead differs from MirStartRead in that rather than setting the IRP count to 1, MirStartPipedRead increments the IRP count by 1, since it now has to verify the reads and one additional pipelined read. When the IRP count is decremented to zero in MirCallBack, this indicates that all the verify reads and the pipelined read have completed. Similar to the process described above, for the read IRP, when the pipelined read IRP is complete, MirReadCallBack will generate a dummy IRP having a state of VERIFY.

When all the I/O requests are complete, MirCallBack (FIG. 10) processes the first dummy IRP having the state of READ_VERIFY. Since the dummy IRP is in the READ_VERIFY state, MirVerifyCallback is called by MirCallBack at step 220.

Figure 10:
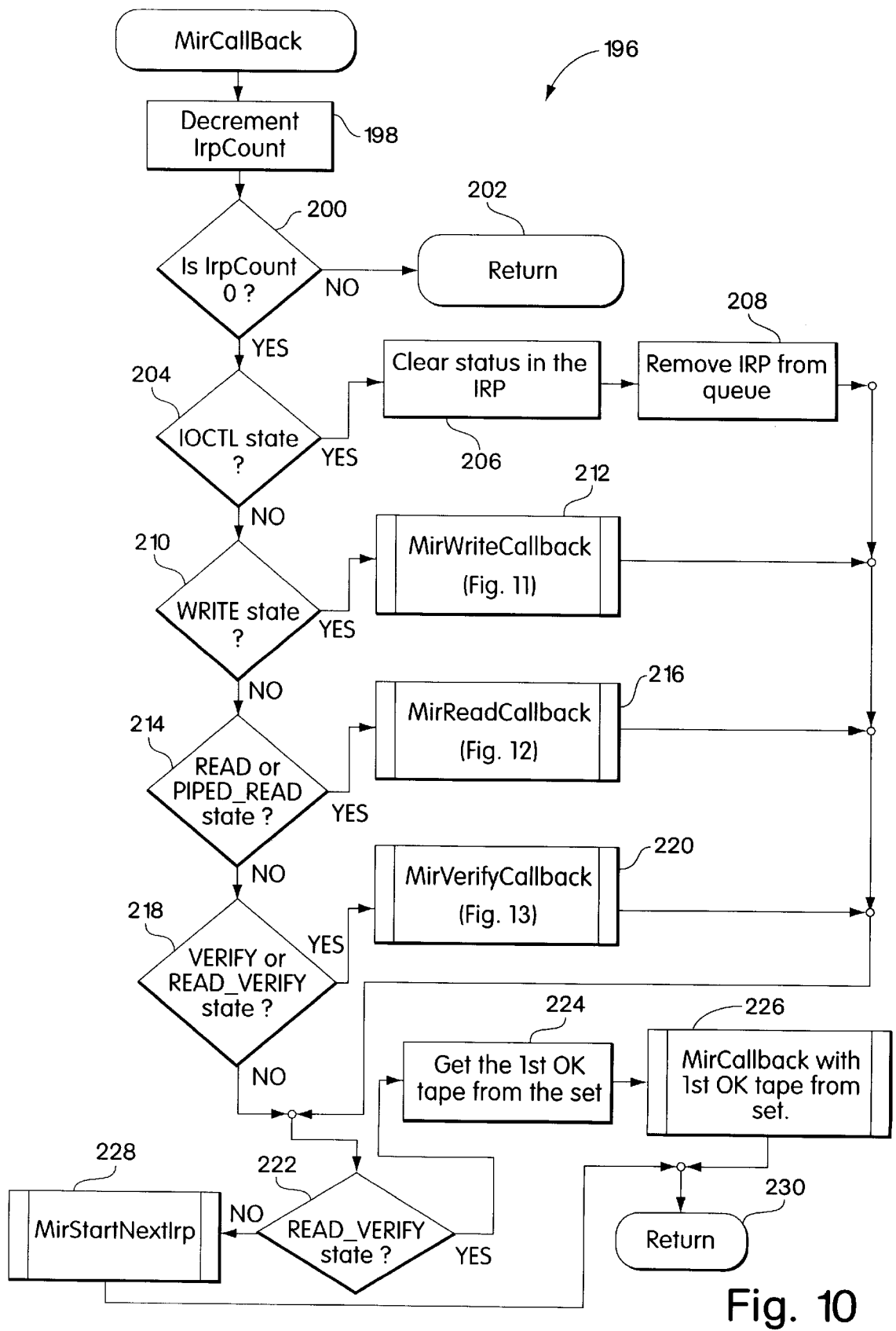
FIG. 10 is a flow chart of a routine MirCallBack in accordance with one embodiment of the present invention.
Figure 13:
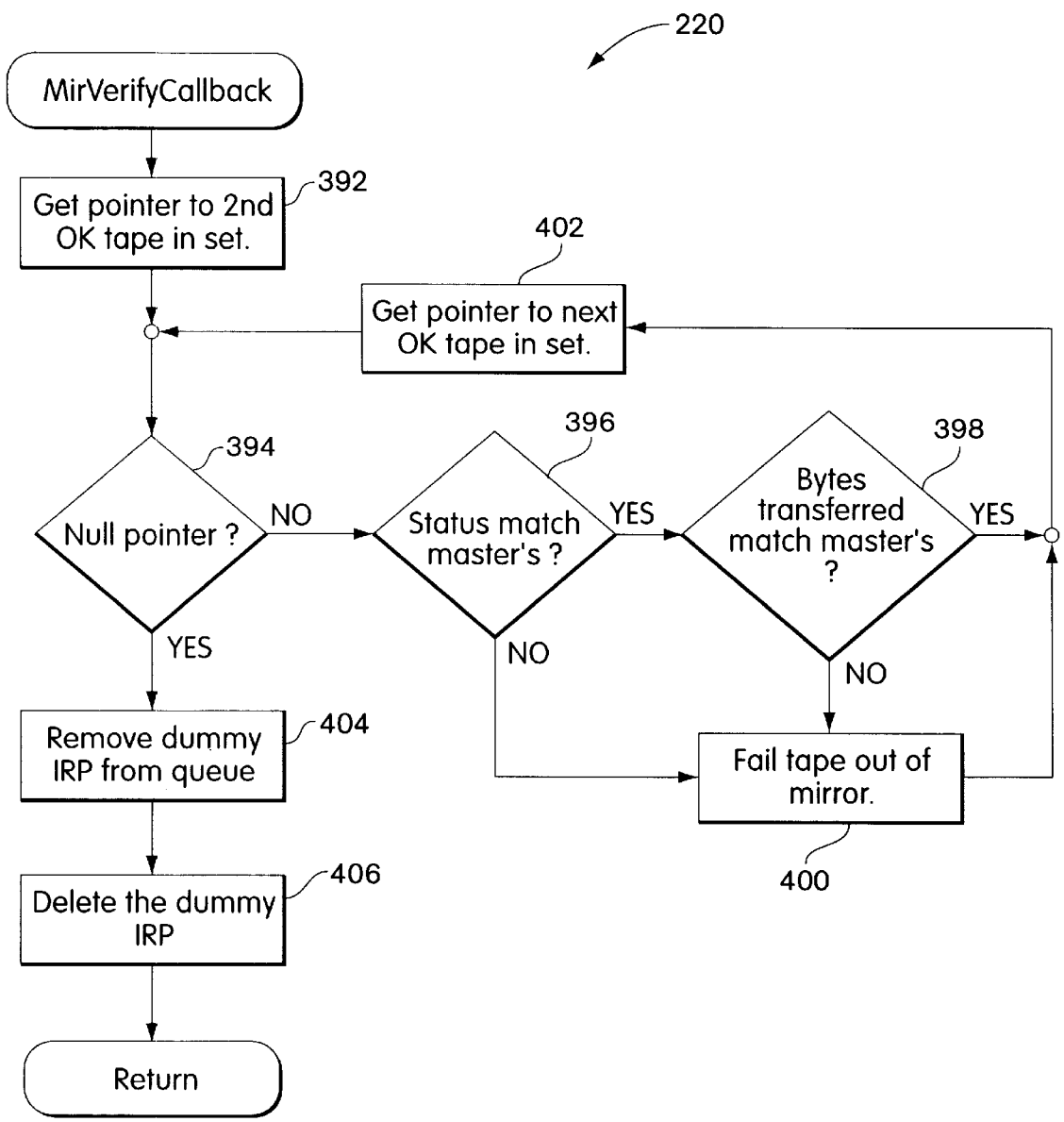
FIG. 13 is a flow chart of a routine MirVerifyCallback in accordance with one embodiment of the present invention.

MirVerifyCallback will now be described with reference to FIG. 13. In steps 392 to 462, Mir VerifyCallback cycles though all of the OK tape drives of the mirror set, except for the first tape drive, and checks the status and byte count returned by each tape drive against the read status that was returned by the first tape drive. If the status or byte count of a tape drive does not match the status and byte count of the first tape drive, the tape drive is failed out of the mirror set. Once all the tape drives are checked, the dummy IRP is removed from the queue and deleted in steps 404 and 406, and control returns to routine MirCallBack (FIG. 10).

MirCallBack checks the state (step 222) that was assigned the dummy IRP. If the state was READ_VERIFY, then a pipelined read has also occurred. In this case, MirCallBack calls itself at step 226 to process the pipelined read from the first tape. The second call to MirCallBack results in MirReadCallback being called. From this point forward, the pipelined read is processed the same as an IRP in the READ state, which was discussed above.

As discussed above, a routine MirReadErrorRecovery is used to handle read errors. MirReadErrorRecovery reads the remaining tape drives sequentially, returns the data and status from the tape drive returning the lowest severity error, and fails out any tape drive that returns status that is different from the status of the tape drive having the lowest severity error.

Figure 25:
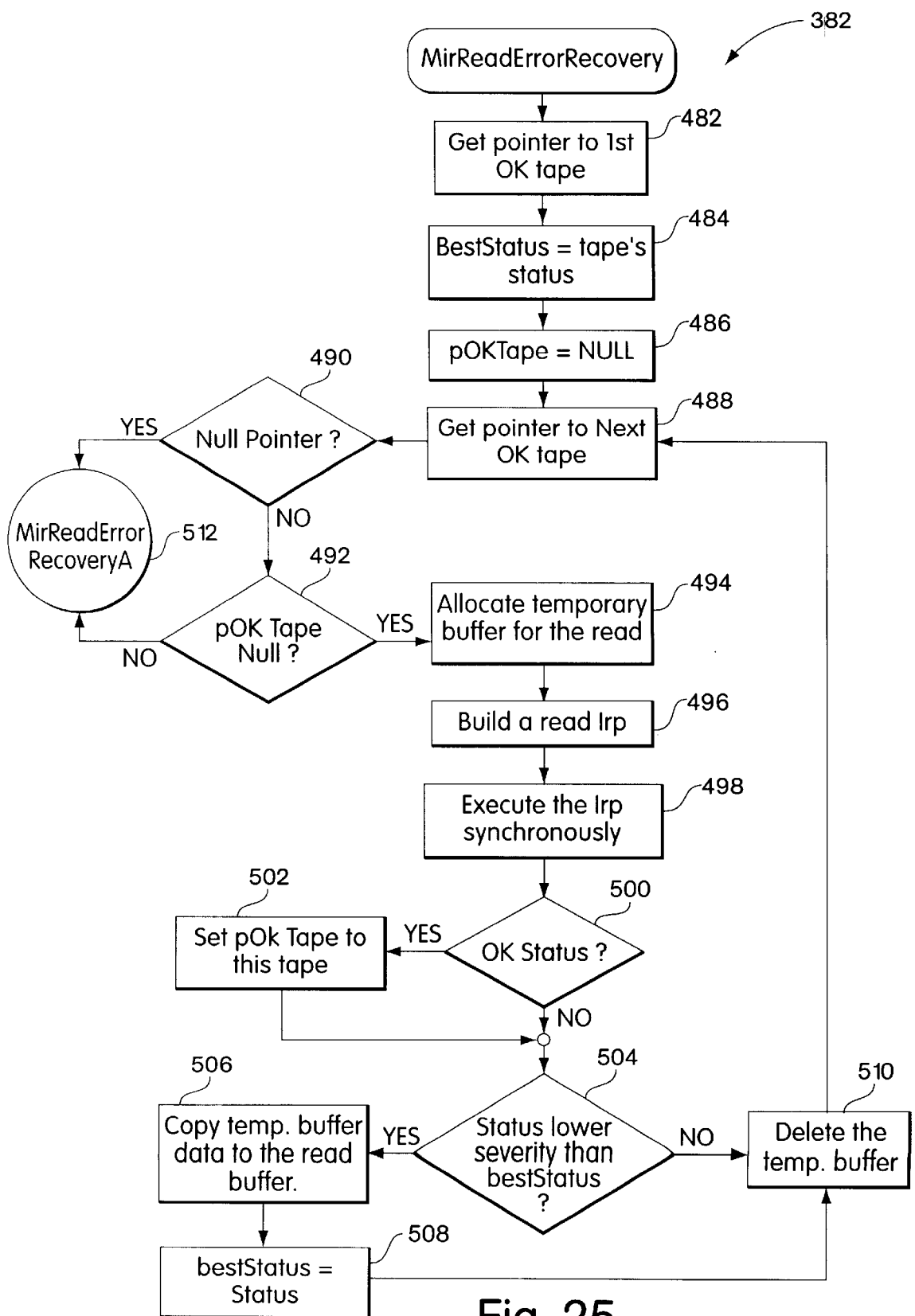
FIG. 25 is a flow chart of a routine MirReadErrorRecovery in accordance with one embodiment of the present invention.

MirReadErrorRecovery will now be discussed in greater detail with reference to FIG. 25. In steps 482, 484, and 486, MirReadErrorRecovery sets a variable BestStatus to the status of the first OK tape drive, and sets a variable pOkTape equal to a null value. In steps 490 to 510, MirReadErrorRecovery uses a loop to read data from each of the tape drives, other than the first tape drive, one at a time. For each tape drive, a temporary buffer and a read IRP are created, and the data is read from the tape drive into the temporary buffer. If the tape drive returns OK status after the read, then the variable pOkTape is set to point to that tape drive. If the tape drive returns better status than any drive before it in the loop, then the data is copied from the temporary buffer to the application's read buffer and the temporary buffer is deleted. The loop repeats until all drives have been accessed or until a good read occurs. MirReadErrorRecovery then calls routine MirReadErrorRecoveryA at step 512.

Figure 26:
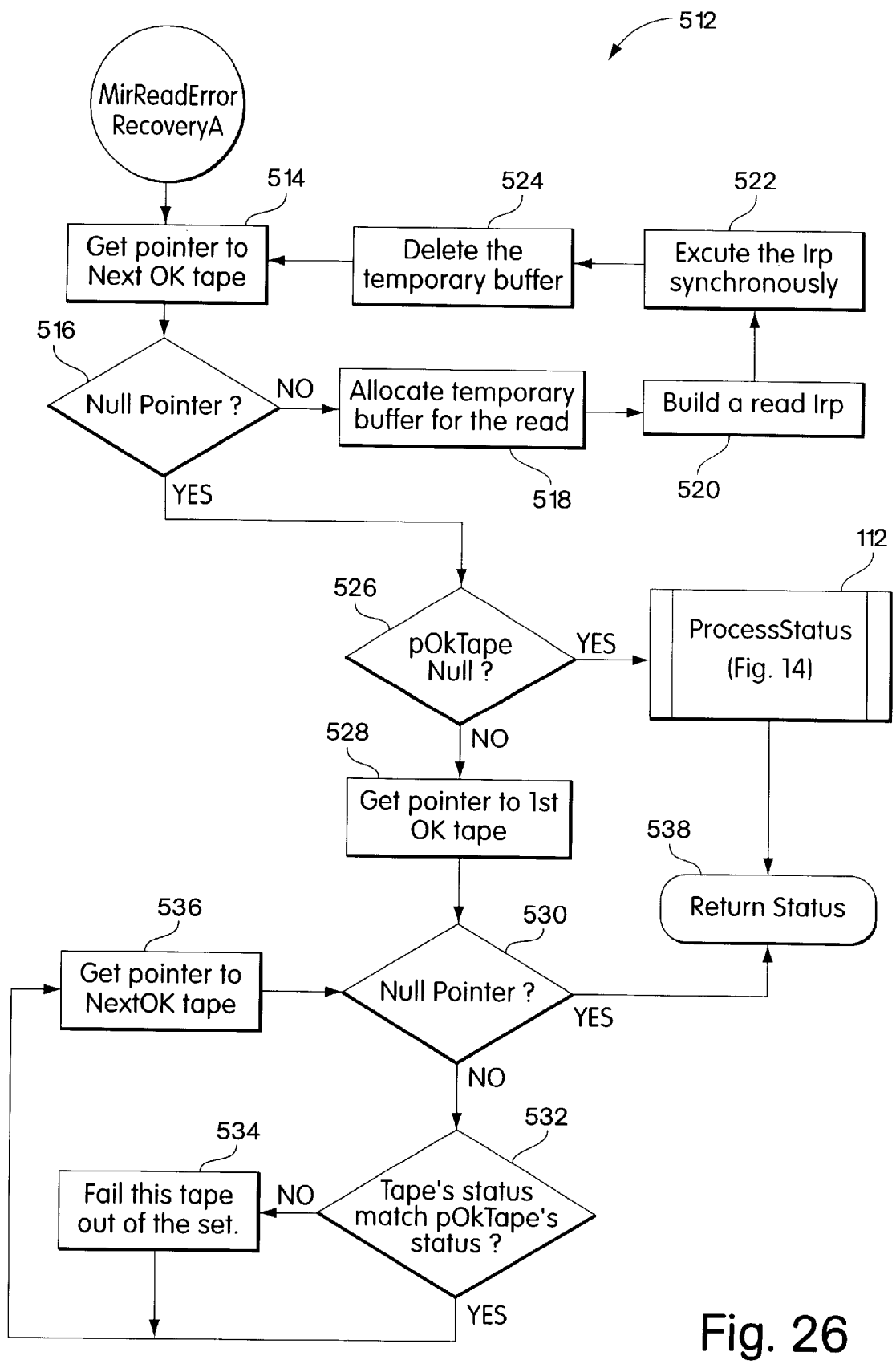
FIG. 26 is a flow chart of a routine MirReadErrorRecoveryA in accordance with one embodiment of the present invention.

MirReadErrorRecoveryA will now be described with reference to FIG. 26. First, in steps 514 to 524, MirReadErrorRecoverxA uses a loop to a read all remaining tape drives in the mirror that were not read by MirReadErrorRecovery. Once the loop is completed, pOkTape is checked in step 526 to see if any of the tape drives returned good status. If none of the tape drives returned good status, ProcessStatus 112 is called to perform standard error processing. If at least one of the tape drives returned good status, then all of the tape drives are again cycled through in steps 530 to 536, and any tape drive that returns a status different than that of the variable POkTape is failed out of the mirror set. MirReadErrorRecoveryA ends by returning the value of pOkTape at step 538.

In embodiments of the present invention, in addition to reporting summary status data to the backup application, more complete status information is reported to the mirror application through the special device driver. The mirror application is then able to report to a user of the system when one or more tape drives have failed out of a mirror set. In addition, in embodiments of the present invention that are implemented in computer systems using the Windows NT operating system, the special device driver reports any mirror errors, including the detection of failed tape devices, to the NT Event log. A user may access a list of mirror errors in the NT event log through the mirror application. In addition, any errors reported by the tape driver 40 or the SCSI controller to the NT Event log may also be viewed by a user through the mirror application.

In embodiments of the present invention, the mirror application in conjunction with the mirror driver includes a number of features to allow copying data from one tape drive to another and to allow the data stored on the media in one tape drive to be compared with the data stored on the media in another tape drive. As understood by those skilled in the art, typical tape drives support a number of different operating modes for writing data to a tape. Some tape drives allow data to be written in variable block sizes (variable block mode) or in fixed block sizes (fixed block mode) using one of a number of possible block sizes. In addition, some tape drives allow compression of data prior to the writing of data on a tape, and some tape drives support the use of filemarks and setmarks. As discussed below, embodiments of the present invention allow copying of tapes and comparing data on tapes regardless of the operating mode of the tape drive used to store the data and without prior knowledge of the mode that was used.

Figure 22:
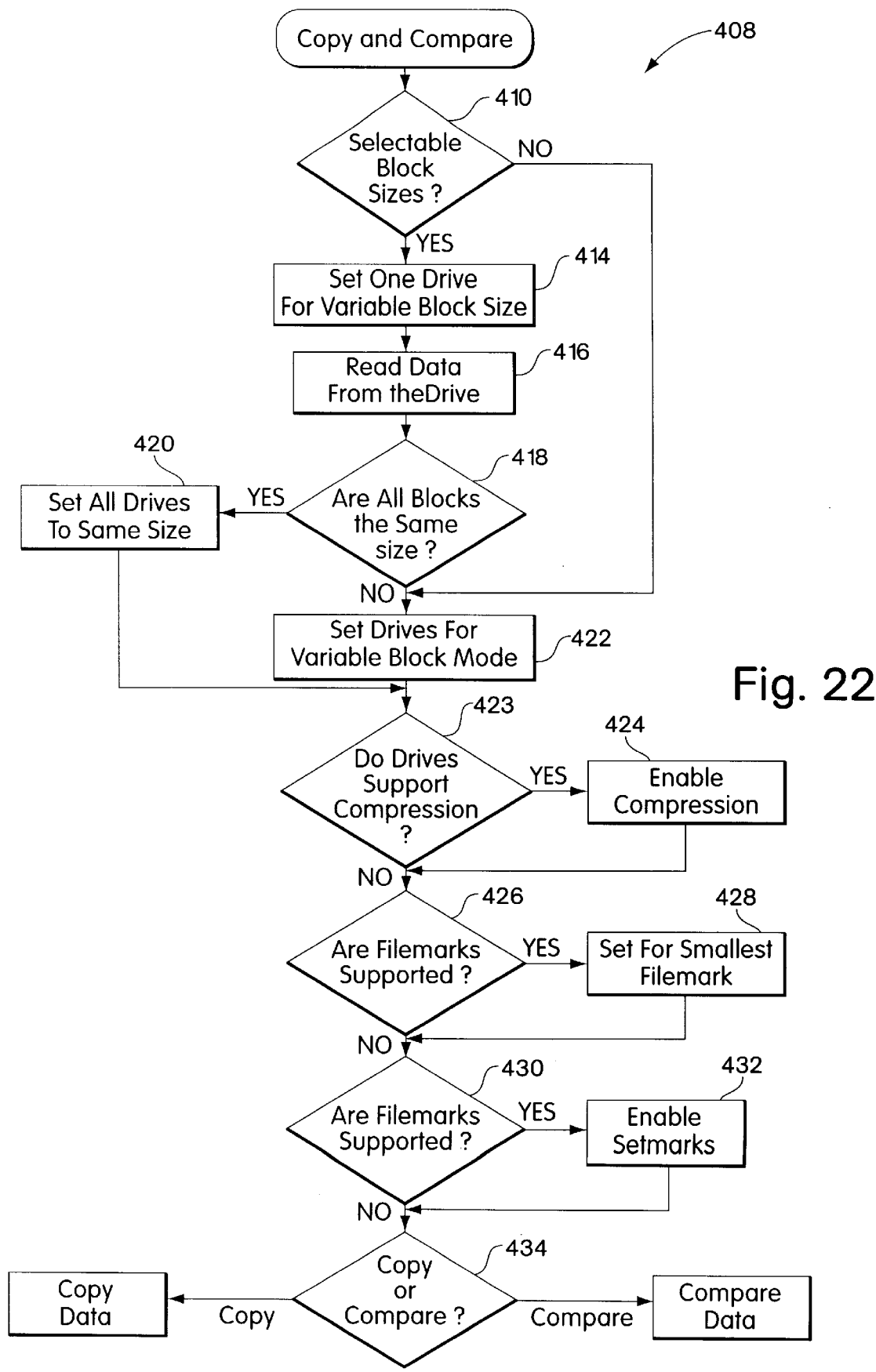
FIG. 22 is a flow chart demonstrating a process for copying data and comparing data in accordance with one embodiment of the present invention.

The copying and comparing utilities are accessed by a user through the mirror application, which accesses the mirror driver through the operating system in a manner similar to that used by the backup applications described above. The process used by the mirror application for copying data from one tape drive to another and for comparing data on one tape drive with data on another tape drive will be described with reference to FIG. 22. In a first step 410, a query is made to the tape driver to determine whether the tape drives support selectable block sizes. If the result of step 410 is NO, then only one block size is supported. If the tape drives support selectable block sizes, then in step 414, one of the tape drives (the source drive for a copy operation) is set for variable block mode, and in step 416, a predetermined quantity of data is read from the tape drive. In one embodiment of the present invention, the predetermined quantity is equal to 1 megabit of data, however, other quantities could be read as well. Next, the data read is examined in step 418 to determine whether all blocks read are of the same size. If the blocks are the same size, then the block size of each of the tape drives is set to that block size in step 420. If the blocks of data read are not all the same size, then in step 422, the tape drives are set for variable block mode.

In the next step 423, a determination is made as to whether the tape drives support compression, and if compression is supported, it is enabled for all of the tape drives in step 424. Next, in step 426, a determination is made as to whether the tape drives support filemarks. If filemarks are supported, then in step 428, then each of the tape drives are enabled for the shortest type of filemark supported. In step 430, a determination is made as to whether setmarks are supported, and if they are, then setmarks are enabled for each of the tape drives in step 432.

At the conclusion of step 432, the tape drives are properly configured for either tape copying or comparing, and in step 434, a determination is made as to whether a user has selected tape copying mode or tape compare mode. If tape copying mode is selected, then in step 436, the data on the source tape drive is copied to one or more destination tape drives, and if tape compare mode is selected, then in step 438 the data from two selected tape drives is read and compared.

For typical backup applications and tape drives, data copied using the process described above will be readable by the backup applications, and data stored on destination tapes will be stored in an efficient manner. When copying from one tape to another, if the source or master tape is filled, or almost filled, with data, it is possible that the destination tape will not be able to contain all of the data on the source tape. This can occur due to errors being encountered on the destination tape or because the destination tape is physically shorter than the source tape.

In one embodiment of the present invention, to reduce the possibility of the destination tape being unable to contain all the data stored on the source tape, the destination tape drive is set to ignore a logical end of tape warning, and to continue writing data on the tape until the physical end of the tape is reached. If the physical end of tape is reached prior to all data on the source tape being copied, then an error message is sent to the mirror application instructing the user to replace the tape in the destination tape drive with a new tape, and to repeat the copy operation with the new tape.

There are several advantages over the prior art of the embodiments of the present invention described above. Embodiments of the present invention allow multiple copies of backup data (or data other than backup data) to be created simultaneously by existing applications in a computer system without requiring specialized hardware. The use of a layered mirror driver allows applications to access multiple tape drives in a same manner as they access a single tape drive with a mirroring operation occurring transparently to the application. In addition, the mirror driver in accordance with embodiments of the present invention is compatible with most tape drives that utilize SCSI buses, since the mirror driver utilizes the same I/O commands and the same data format generated by the backup application to access the tape drive. Therefore, unique mirror drivers do not have to be created for each backup application and tape drive.

Yet another advantage of embodiments of the present invention is the ability to use a tape drive selectively either in a mirror set of tape drives or as a stand alone tape drive based on a logical tape drive selected by an application from a list of available tape drives provided by the operating system.

Still another advantage of embodiments of the present invention is that a backup application can continue to read data from or write data to a mirror set when one or more of the tape drives in the mirror set have failed, as long as one operational tape drive remains in the mirror set. The reporting of failed mirror tape drives to the mirror application, rather than to the backup application, allows the backup application to proceed unaffected by the failure of mirror tape drives. This is particularly beneficial when one tape drive of a mirror set fails during a lengthy, unattended backup operation, since the backup operation will continue unaffected by the failure of the tape drive.

Embodiments of the present invention described above provide mirroring capabilities to a computer system using a mirror driver and a mirror application. As understood by those skilled in the art, the mirror driver and mirror application may be implemented in hardware, software, or using a combination of hardware and software. When software is used to implement the mirror driver and the mirror application, the software may be stored on one of a number of storage mediums such as magnetic tape, floppy disk, or CD ROM, or may reside on permanent memory devices within a computer system.

Embodiments of the present invention described above utilize tape drives for storing backup data. However, embodiments of the present invention are not limited to computer systems utilizing tape drives to provide backup storage, but also include computer systems using media other than magnetic tape such as CD ROMs, disks or any other media. In addition, the tape drives are described as being coupled to other devices in the computer system through a SCSI bus. Embodiments of the present invention are not limited to computer systems that utilize SCSI buses, but rather, also include computer systems using interconnection schemes other than SCSI buses.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A computer system comprising:

an application program;

a plurality of storage devices, wherein at least some of the plurality of storage devices form a mirror set of storage devices;

at least one storage driver that provides an interface between the application program and the plurality of storage devices; and a mirror driver that receives an I/O request from the application program requesting access to one of the plurality of storage devices, duplicates the I/O request to create a plurality of I/O requests, and sends the plurality of I/O requests to the at least one storage driver so that each storage device of the mirror set receives and processes one of the I/O requests;

wherein the at least one storage driver is coupled to the application program via a first path and a second path, the first path including the mirror driver and the second path bypassing the mirror driver.

2. The computer system of claim 1, wherein the computer system further comprises a mirror application that communicates with the mirror driver to establish which of the plurality of storage devices are included in the mirror set.

3. The computer system of claim 2, wherein the I/O request from the application program includes data that is to be stored in one of the plurality of storage devices, and wherein the mirror driver sends a copy of the data to each of the plurality of storage devices in the mirror set so that a copy of the data is stored in each of the plurality of storage devices of the mirror set.

4. A computer system comprising:

an application program;

a plurality of storage devices, wherein at least some of the plurality of storage devices form a mirror set of storage devices;

at least one storage driver that provides an interface between the application program and the plurality of storage devices;

a mirror driver that receives an I/O request from the application program requesting access to one of the plurality of storage devices, duplicates the I/O request to create a plurality of I/O requests, and sends the plurality of I/O requests to the at least one storage driver so that each storage device of the mirror set receives and processes one of the I/O requests;

a mirror application that communicates with the mirror driver to establish which of the plurality of storage devices are included in the mirror set; and a first buffer and a second buffer, wherein the I/O request from the application program is a read request to read data from at least one of the storage devices in the mirror set, and wherein the mirror driver, in response to the read request, is configured to read data from a first storage device of the mirror set and to store the data read in the first buffer, and is configured to read data from all storage devices other than the first storage device in the mirror set and to store the data read from the storage devices other than the first storage device in the second buffer.

5. The computer system of claim 4, wherein the first buffer has a data storage capacity approximately equal to a quantity of data read from the first storage device, and wherein the second buffer has a data storage capacity approximately equal to the data storage capacity of the first buffer.

6. The computer system of claim 2, wherein the mirror application is configured to, upon request by a user, send a request to the mirror driver, requesting that data on a storage medium in a first storage device of the plurality of storage devices be copied to a storage medium in a second storage device of the plurality of storage devices.

7. The computer system of claim 6, wherein the mirror driver is configured to determine a storage format of the data on the first storage medium and to use the storage format when copying data to the second storage device.

8. The computer system of claim 1, wherein each of the plurality of storage devices is a tape drive.

9. A data storage method for storing data in and retrieving data from a plurality of storage devices, the method comprising steps of:

receiving a first storage command for one of the plurality of storage devices;

using the first storage command to create a plurality of second storage commands;

sending one of the second storage commands to each of the plurality of storage devices, wherein the second storage command is a request to read data from one of the plurality of devices;

reading data from a first device of the plurality of storage devices;

storing data read from the first device of the plurality of storage devices in a first buffer;

reading data from each of the plurality of devices other than the first device; and storing data read from each of the plurality of devices other than the first device in a second buffer.

10. The method of claim 9, further comprising steps of:

verifying that data was successfully read from the first device; and deleting the data stored in the second buffer.

11. The method of claim 10, wherein the first buffer has a data storage capacity approximately equal to a data storage capacity of the second buffer.

12. The method of claim 9, further comprising steps of:

detecting that data was not successfully read from the first device;

reading data from one of the plurality of devices other than the first device; and storing the data read from the one of the plurality of devices other than the first device in the first buffer.

13. A computer readable medium for containing a computer program for a computer system having a processor, an operating system, an application program, a plurality of storage devices, and at least one storage driver that acts as an interface between the application program and the plurality of storage devices, the computer program including instructions for:

receiving an I/O request from the application program;

creating a copy of the I/O request;

sending the I/O request and the copy of the I/O request to the at least one storage driver;

reading data from a first device of the plurality of storage devices;

storing data read from the first device of the plurality of storage devices in a first buffer; reading data from each of the plurality of devices other than the first device; and storing data read from each of the plurality of devices other than the first device in a second buffer.

14. The computer readable medium of claim 13, further comprising instructions for:

verifying that data was successfully read from the first device; and deleting the data stored in the second buffer.

15. The computer readable medium of claim 13, further comprising instructions for:

detecting that data was not successfully read from the first device;

reading data from one of the plurality of devices other than the first device; and storing the data read from the one of the plurality of devices other than the first device in the first buffer.

16. The computer system of claim 1 wherein the I/O request is a read request.

* * * * *